(12) United States Patent
Kamihara et al.

(10) Patent No.: US 7,402,352 B2
(45) Date of Patent: Jul. 22, 2008

(54) FUEL CELL SYSTEM AND RELATED STARTUP METHOD

(75) Inventors: Tetsuya Kamihara, Yokohama (JP); Nobutaka Takahashi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 679 days.

(21) Appl. No.: 10/491,589

(22) PCT Filed: Apr. 23, 2003

(86) PCT No.: PCT/JP03/05179

§ 371 (c)(1),
(2), (4) Date: Apr. 2, 2004

(87) PCT Pub. No.: WO03/009640

PCT Pub. Date: Nov. 20, 2003

(65) Prior Publication Data

US 2004/0241511 A1 Dec. 2, 2004

(30) Foreign Application Priority Data

May 14, 2002 (JP) ............................. 2002-138905
May 14, 2002 (JP) ............................. 2002-138919

(51) Int. Cl.
*H01M 8/04* (2006.01)
*H01M 8/02* (2006.01)
*H01M 8/10* (2006.01)

(52) U.S. Cl. .............................. 429/13; 429/22; 429/25

(58) Field of Classification Search .................. 429/13, 429/22, 25, 38
See application file for complete search history.

(56) References Cited

U.S. PATENT DOCUMENTS 4,680,240 A 7/1987 Furukawa et al.

(Continued)

FOREIGN PATENT DOCUMENTS

EP 0 633 158 A1 1/1995

(Continued)

OTHER PUBLICATIONS

OPDL Machine Translation of JP 2002-093438 A*

(Continued)

*Primary Examiner*—Gregg Cantelmo
(74) *Attorney, Agent, or Firm*—Foley & Lardner LLP

(57) ABSTRACT

A fuel cell system (FS) is provided with a fuel cell (1) having a fuel electrode (1c) and an oxidizer electrode (1a), disposed in opposition thereto, between which an electrolyte membrane (1b) is sandwiched, a fuel gas supply source (2) supplying fuel gas to the fuel cell through a fuel gas supply passage (4), a fuel gas discharge section (8, 8') discharging the fuel gas, discharged from the fuel cell, to an outside of a fuel cell system, and a control section (14) executing fuel gas substituting treatment such that, during startup of the fuel cell system, the fuel gas is discharged outside the fuel cell system through the fuel gas discharge section while supplying the fuel gas so as to cause a state quantity of the fuel gas, to be supplied to the fuel cell from the fuel gas supply source, to be constant for thereby allowing the fuel gas passage and the fuel electrode to be substituted with the fuel gas.

24 Claims, 15 Drawing Sheets

U.S. PATENT DOCUMENTS

| | | | |
|---|---|---|---|
| 5,302,471 A | 4/1994 | Ito et al. | |
| 5,794,732 A | 8/1998 | Lorenz et al. | |
| 2001/0055707 A1 | 12/2001 | Roberts et al. | |
| 2002/0009623 A1 | 1/2002 | St-Pierre et al. | |
| 2003/0022034 A1 * | 1/2003 | Suzuki | 429/13 |

FOREIGN PATENT DOCUMENTS

| | | | |
|---|---|---|---|
| JP | 6-176783 A | | 6/1994 |
| JP | 09022714 A | * | 1/1997 |
| JP | 2735396 B2 | | 1/1998 |
| JP | 2002093438 A | * | 3/2002 |
| JP | 2002-124290 A | | 4/2002 |
| JP | 2002-313390 A | | 10/2002 |
| JP | 3879429 B2 | | 11/2006 |

OTHER PUBLICATIONS

Patent Abstract of Japan, vol. 7, No. 288, Dec. 22, 1983, JP 58-163182, Sep. 27, 1983.

Patent Abstract of Japan, vol. 13, No. 147, Apr. 11, 1989, JP 63-308876, Dec. 16, 1988.

Patent Abstract of Japan, vol. 11, No. 36, Feb 3. 1987, JP 61-203576, Sep. 9, 1986.

Patent Abstract of Japan, vol. 16, No. 74, Feb. 24, 1992, JP 3-266366, Nov. 27, 1991.

* cited by examiner

FUEL CELL SYSTEM AND RELATED STARTUP METHOD

TECHNICAL FIELD

The present invention relates to a fuel cell system and a related method and, more particularly, to a fuel cell system and its related method that are able to shorten a startup time interval.

BACKGROUND ART

In recent years, public attention has heretofore been focused on a fuel cell that serves as an electric power supply with a high energy conversion efficiency and minimal amount of exhaust emissions, such as carbon dioxide, and therefore has applications not only in automotive vehicles but also in general industrial fields or in domestic uses in a wide range. Such a fuel cell is operative to achieve electrochemical reaction using hydrogen and oxygen to obtain an electric energy and, to this end, various research and development works have heretofore been made.

Japanese Patent Publication No. 2735396 discloses a startup method for a fuel cell system. In such a startup method, when the fuel cell system is started up, an output voltage of a fuel cell is monitored during supply of fuel and air to the fuel cell and, when an output voltage level goes beyond an allowable lower limit value, electric power output is taken out form the fuel cell in correspondence with a load.

DISCLOSURE OF INVENTION

However, upon considerable studying works conducted by the present inventors, the following phenomenon conceivably occurs when taking out the electric power output even in the presence of an increased state in the output voltage of the fuel cell.

In particular, suppose that the fuel cell system has stood under a non-operating condition for a long time period. In such a standing state, a situation arises in that fuel gas in a fuel electrode and a fuel delivery pipe of the fuel cell tends to be gradually dispersed outside the system or fuel gas gradually react with oxygen in air contained in the fuel cell to be lost and, so, the fuel electrode and the fuel delivery pipe tend to assume a state filled with air or nitrogen.

Under such a condition, if the fuel electrode and the air electrode are supplied with fuel gas and air, respectively, in order to startup the fuel cell system, the output voltage of the fuel cell tends to build up quickly even in an occasion where air in the fuel electrode and the fuel delivery pipe is not adequately substituted with fuel gas.

However, if the electric power output is taken out from the fuel cell soon under such a condition, then due to an insufficient degree of fuel gas concentration prevailing in the fuel delivery pipe and the fuel electrode, it is conceivable that rapid voltage drop occurs, resulting in a tendency of an inability of obtaining a stable electric power output.

The present invention has been completed upon the above-described studies conducted by the present inventors and has an object to provide a fuel cell system and its related method that, even after the fuel cell system has stood for a long time period, are able to reliably startup in a short time period.

To achieve such an object, a first aspect of the present invention provides a fuel cell system comprising: a fuel cell having a fuel electrode and an oxidizer electrode, disposed in opposition thereto, between which an electrolyte membrane is sandwiched; a fuel gas supply source supplying fuel gas to the fuel cell through a fuel gas supply passage; a fuel gas discharge section discharging the fuel gas, discharged from the fuel cell, to an outside of a fuel cell system; and a control section executing fuel gas substituting treatment such that, during startup of the fuel cell system, the fuel gas is discharged outside the fuel cell system through the fuel gas discharge section while supplying the fuel gas so as to cause a state quantity (quantity of state) of the fuel gas, to be supplied to the fuel cell from the fuel gas supply source, to be constant for thereby allowing the fuel gas passage and the fuel electrode to be substituted with the fuel gas.

In other word, another aspect of the present invention provides a fuel cell system comprising: a fuel cell having a fuel electrode and an oxidizer electrode, disposed in opposition thereto, between which an electrolyte membrane is sandwiched; supplying means for supplying fuel gas to the fuel cell through a fuel gas supply passage; discharging means for discharging the fuel gas, discharged from the fuel cell, to an outside of a fuel cell system; and controlling means for controlling fuel gas substituting treatment such that, during startup of the fuel cell system, the fuel gas is discharged outside the fuel cell system through the discharging means while supplying the fuel gas so as to cause a state quantity of the fuel gas, to be supplied to the fuel cell from the supplying means, to be constant for thereby allowing the fuel gas passage and the fuel electrode to be substituted with the fuel gas.

On the other hand, the other aspect of the present invention provides a method of substituting fuel gas in a fuel cell system which includes a fuel cell having a fuel electrode and an oxidizer electrode, disposed in opposition thereto, between which an electrolyte membrane is sandwiched, the method comprising: supplying fuel gas to a fuel cell through a fuel gas supply passage; discharging the fuel gas, discharged from the fuel cell, to an outside of a fuel cell system; and executing fuel gas substituting treatment such that, during startup of the fuel cell system, the fuel gas is discharged outside the fuel cell system while supplying the fuel gas so as to cause a state quantity of the fuel gas, to be supplied to the fuel cell, to be constant for thereby allowing the fuel gas passage and the fuel electrode to be substituted with the fuel gas.

Other and further features, advantages, and benefits of the present invention will become more apparent from the following description taken in conjunction with the following drawings.

BEST MODE FOR CARRYING OUT THE INVENTION

Hereunder, a fuel cell system and its related method of each of embodiments according to the present invention are described in detail with reference to accompanying drawings.

First Embodiment

First, a fuel cell system and its related method of a first embodiment according to the present invention are described in detail with reference to FIGS. 1 to 3.

Figure 1:
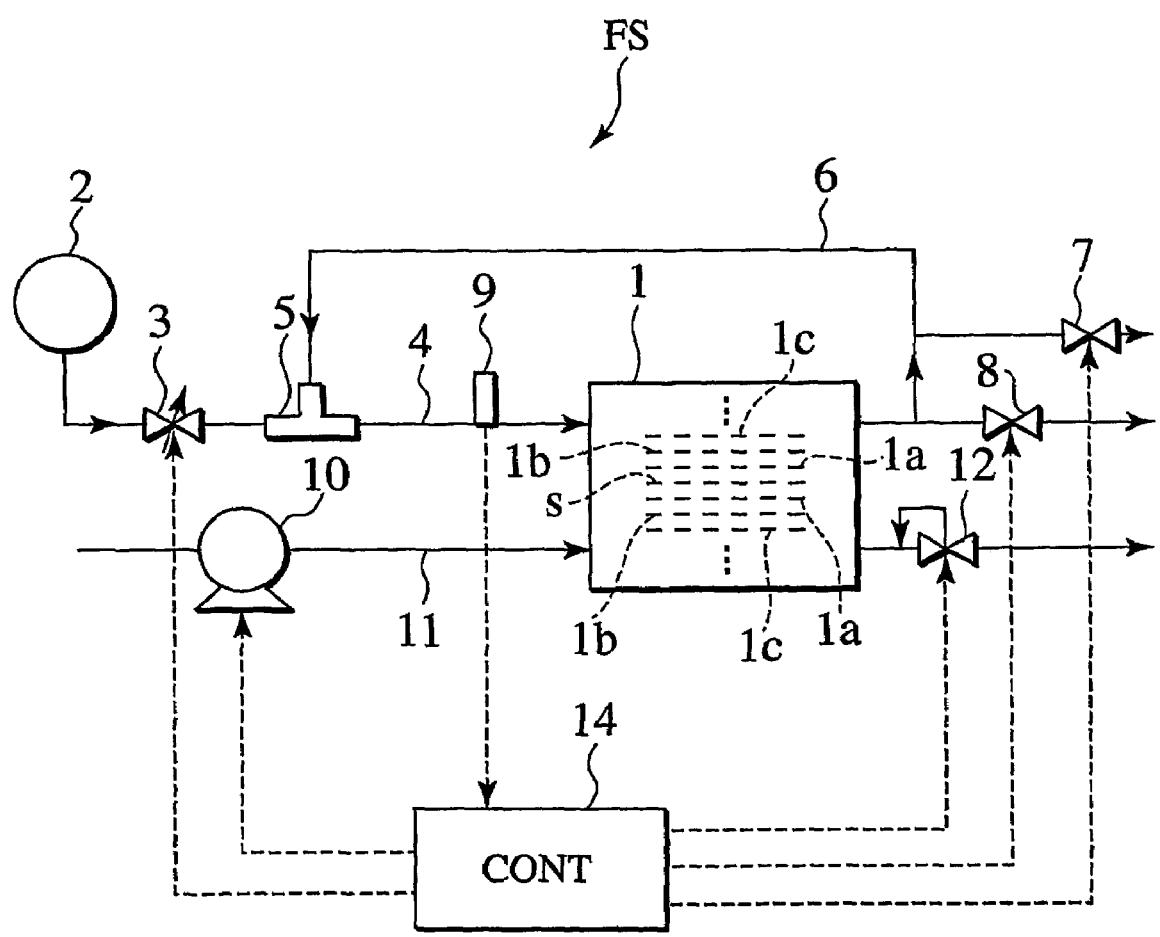
FIG. 1 is a structural view illustrating a structure of a fuel cell system of a first embodiment according to the present invention.
Figure 2:
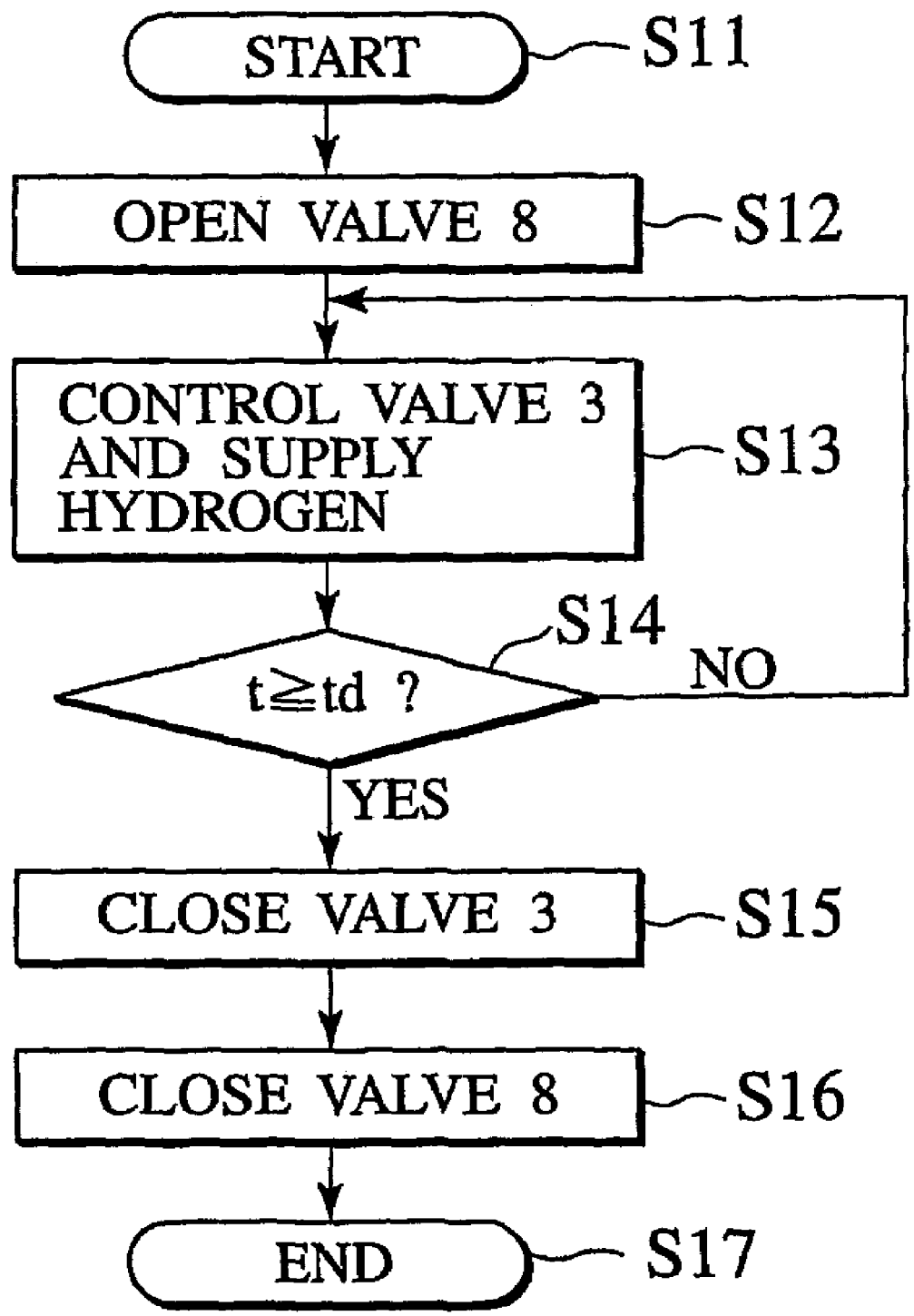
FIG. 2 is a flowchart illustrating substituting operation of fuel gas during startup of the fuel cell system in the first embodiment.

FIG. 1 is a structural view illustrating a structure of the fuel cell system FS of the presently filed embodiment.

In FIG. 1, a fuel cell stack 1, forming a fuel cell body of the fuel cell system, is comprised of a stack of plurality of fuel cell structural bodies. Each of the plurality of fuel cell structural bodies is composed of an oxidizer electrode 1$a$ and a fuel electrode 1$c$ between which a solid polymer electrolyte membrane 1$b$ is sandwiched, and it is laminated via a separator S in order. Also, hydrogen gas is used as fuel gas and air is used as oxidizing gas (oxidizer gas).

Hydrogen gas in a hydrogen tank 2 is fed through a variable throttle valve 3 to the fuel cell stack 1. The variable throttle valve 3 is controlled by a controller 14 in such a manner that, during a normal operating mode of the fuel cell system, a pressure at which hydrogen is supplied to the fuel cell stack 1 is appropriately varied.

An ejector 5 is disposed in a hydrogen delivery pipe 4 that serves as a fuel gas supply passage between the variable throttle valve 3 and the fuel cell stack 1. Excessive hydrogen discharged from the fuel cell stack 1 is returned through a hydrogen return pipe 6, connected downstream of the fuel cell stack 1, to an intake port of the ejector 5. Thus, the controller 14 is arranged to control so as to circulate hydrogen through the ejector 5, resulting in an increase in a reaction efficiency of the fuel cell stack 1.

Connected to the hydrogen return pipe 6 is an opening and closing valve 7 that, in a case where a hydrogen path in the fuel cell stack 1 is blocked by water during the normal operating mode of the fuel cell system, serves as a purge valve to cause the hydrogen path to be temporarily purged.

Disposed downstream of the fuel cell stack 1 is an opening and closing valve 8 that, during a startup mode of the fuel cell system, forms a hydrogen substituting valve serving as a fuel-gas discharge valve to permit fuel gas, to be substituted with hydrogen in a hydrogen line, which includes the hydrogen delivery pipe 4, the fuel electrodes 1$c$ and the hydrogen return pipe 6, to be exhausted outside the fuel cell system, and that is determined to have a larger opening area than the purge valve 7.

Disposed in the hydrogen delivery pipe 4 between the ejector 5 and the fuel cell stack 1 is a pressure sensor 9 that detects a pressure of hydrogen to be supplied to the fuel cell stack 1 and, more specifically, the pressure of hydrogen gas to be supplied to the fuel electrodes 1$c$ of the fuel cell stack 1 with detected hydrogen pressure being used when controlling the opening degree of the variable throttle valve 3 by the controller 14 while, simultaneously, being used when executing hydrogen substituting treatment in a manner as will be described below.

A compressor 10 is arranged to compress air and supplies compressed air to an inlet of each oxidizer electrode of the fuel cell stack 1 through an air delivery pipe 11. An air pressure regulator valve 12 connected to an outlet of each oxidizer electrode serves to regulate an air pressure of the oxidizer electrodes. The controller 14 is configured to control the flow rate and the air pressure of air to be supplied to the fuel cell stack 1 by controlling the compressor 10 and the air pressure regulator valve 12.

Now, operation of the fuel cell system with the structure mentioned above during the startup mode is described below in detail with reference to a flowchart of FIG. 2.

First, in step S11, if the controller 14 receives a command for starting up the fuel cell system, the controller 14 begins to implement fuel gas substituting treatment (hydrogen substituting treatment) to cause residual gas, existing in the hydrogen line of the fuel gas passage 4, the fuel electrodes 1$c$ of the fuel cell stack 1 and the hydrogen return line 6, to be substituted with fuel gas.

Subsequently, in step S12, the hydrogen substituting valve 8 is opened and, in consecutive step S13, the opening degree of the variable throttle valve 3 is regulated so as to cause a stack-hydrogen-electrode pressure (an inlet pressure of hydrogen gas to be supplied to the fuel cell stack 1), that is, the pressure detected by the pressure sensor 9 to be constant (e.g., under a pressure of approximately 0.2 bar), while supplying hydrogen to the fuel gas passage 4 and the fuel electrodes 1$c$ to achieve hydrogen substituting treatment (fuel gas substitution) to cause gas remained in such a hydrogen line to be substituted with newly supplied hydrogen.

Subsequently, if a substituting time t is equal to or exceeds a given time td (e.g., of approximately 10 seconds) in step S14, then discrimination is deemed to be made that the hydrogen line is sufficiently substituted with hydrogen and, in consecutive step S15, in order to terminate hydrogen substituting treatment, the variable throttle valve 3 is closed to interrupt a further supply of hydrogen whereupon, in succeeding step S16, the hydrogen substituting valve 8 is closed and operation proceeds to step S17 where a series of hydrogen substituting treatment is terminated.

Then, consecutively, the fuel cell stack 1 is supplied with air and hydrogen gas based on normal driving operation, thereby permitting an electrical power output to be commenced to be taken out in correspondence with a load.

Also, the given time td used in step S14 has been predetermined based on the fact that a time interval, in which hydrogen substitution is sufficiently achieved in the hydrogen line of the fuel cell system even when the same is fully filled with air, can be preliminarily and experimentally obtained.

By the way, with the structure set forth above, the hydrogen substituting valve 8 having the larger opening area than the purge valve 7 is provided separately from the purge valve 7. The reason for provision of these two separate valves is that, while it is desirable for the purge valve to have an opening area with an irreducible minimum of a demand with a view to avoiding deterioration in fuel consumption, the presence of such purge valve tends to increase a pressure loss when attempting to cause hydrogen to flow through the purge valve at a large flow rate during hydrogen substitution at the startup time and hydrogen substitution becomes hard to be efficiently achieved.

Figure 3:
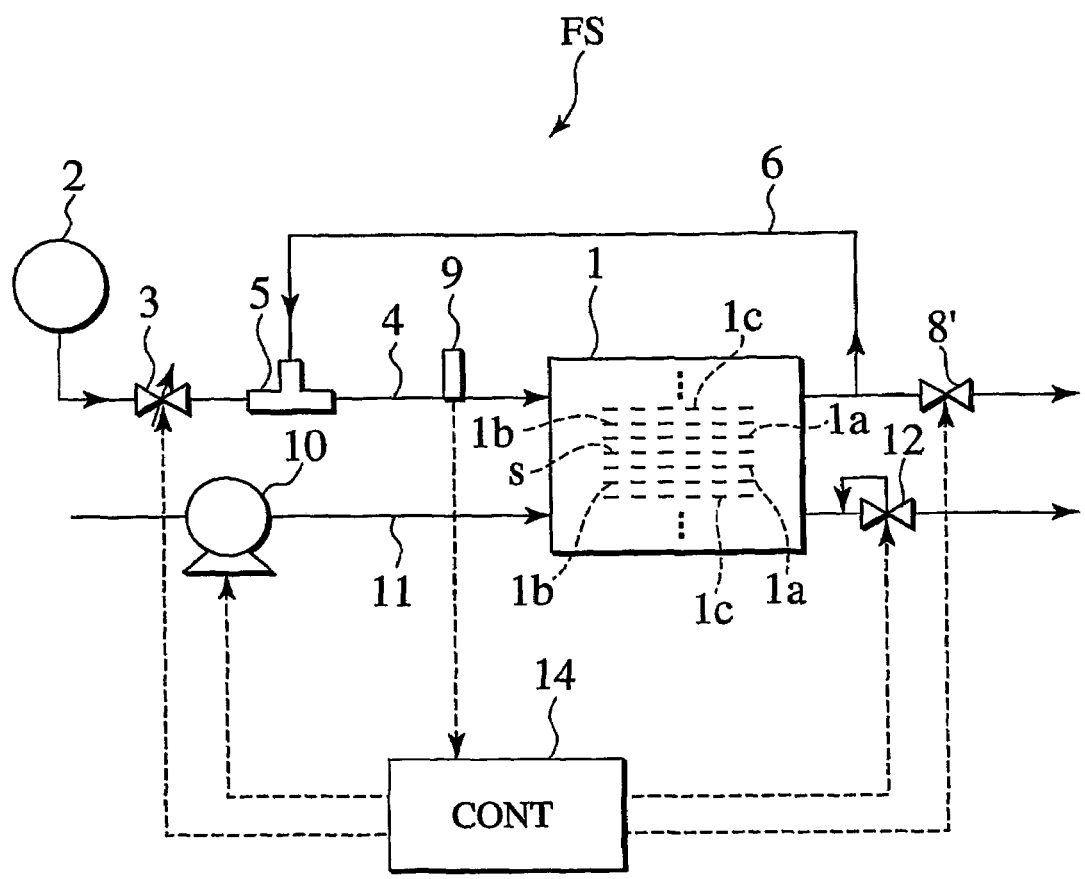
FIG. 3 is a structural view illustrating a modified form of the structure of the fuel cell system in the first embodiment.

However, of course, as shown in FIG. 3, the use of one opening and closing valve 8' serving as both of the purge valve and the hydrogen substituting valve is not objectionable. In such a case, if the valve has an increased opening area, then a purge flow rate undesirably increases when initiating the purge during the normal driving operation, resulting in an increase in fuel consumption. On the contrary, if the valve has a decreased opening area, then the pressure exerted to the fuel stack 1 increases due to the pressure loss when increasing the hydrogen-substitution flow rate during the startup operation and, hence, there is no choice for the hydrogen-substitution flow rate but to be decreased, with a resultant prolonged length of required substitution time and a prolonged startup time period.

Therefore, in view of the above occasions, the opening and closing valve 8' to be used as the purge valve and the hydrogen substituting valve is not simply formed in the opening and closing valve but may be preferably formed in a valve that has opening degrees in two stages. Then, the valve may be configured such that a second opening area of the valve, when it is operative as the hydrogen substituting valve, is determined to be larger than a first opening area of the valve when it is operative as the purge valve.

Thus, by providing one opening and closing valve 8' that serves as the purge valve and the hydrogen substituting valve, it becomes possible to reduce costs. As a consequence, selection may be made between the two valves shown in FIG. 1 and the one valve shown in FIG. 3 in comparative consideration of fuel consumption rates, startup time and costs.

As set forth above, since the structure of the presently filed embodiment is configured such that, during the startup of the fuel cell system, fuel gas is discharged from the hydrogen substituting valve (fuel gas discharge valve) while supplying fuel gas to the fuel cell body so as to maintain the gas pressure of the fuel electrodes at the substantially constant level whereby fuel gas substitution is carried out to substitute residual gas in the fuel gas passage and the fuel electrodes of the fuel cell body with fuel gas, it is possible to reliably perform hydrogen substitution at a sufficiently demanded rate, enabling reliable startup in a short period even when the system has been left for a long time period.

Further, the provision of the hydrogen substituting valve with a larger opening area than the purge valve enables to provide rapid fuel gas substitution and improved fuel consumption compatibility.

Furthermore, since fuel gas substitution is terminated when a given time interval in which fuel gas substitution is achieved for supplying fuel gas to the fuel cell body to cause the fuel gas pressure of the fuel electrodes to be maintained at a substantially constant level has elapsed, discrimination can be made through a simple control to see whether fuel gas substitution is terminated.

Also, while the presently filed embodiment has been described in connection with a particular system wherein hydrogen is circulated through the ejector, it is needless to say that the structure of presently filed embodiment may also be applied not only to a system wherein hydrogen is circulated using a hydrogen circulation pump adapted to be powered by an external power source but also to a system wherein hydrogen is not circulated.

Second Embodiment

Now, a fuel cell system and its related method of a second embodiment of the present invention are described in detail with reference to FIGS. 4 to 7.

The presently filed embodiment is fundamentally similar in structure to the first embodiment shown in FIG. 1. Of course, the presently filed embodiment may be based on the structure shown in FIG. 3.

Figure 4:
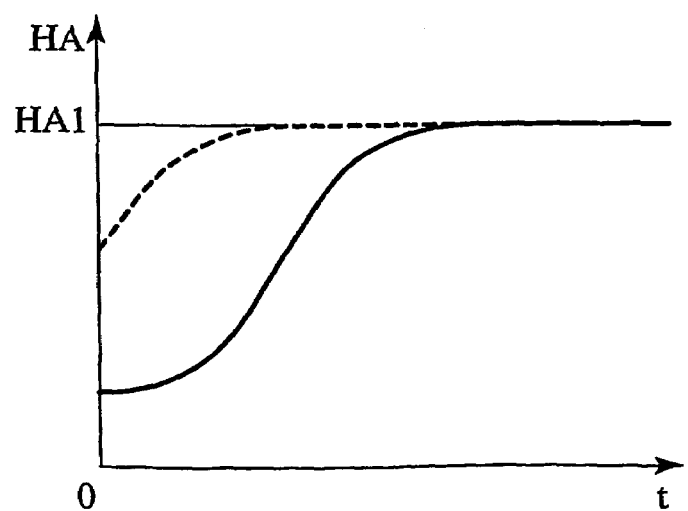
FIG. 4 is a view illustrating a hydrogen supply flow rate HA with respect to an elapsed time t in a case where hydrogen is supplied at a constant pressure using the fuel cell system of the first embodiment, and the hydrogen supply flow rate HA has been studied in a second embodiment according to the present invention.

By the way, upon a further detailed study of the structure of the first embodiment, when carrying out fuel gas substitution in a way to cause the pressure of hydrogen (the pressure at the inlet of the fuel call stack) supplied to the fuel cell stack 1 to be constant, as shown in FIG. 4, the hydrogen supply flow rate HA commencing from the start of fuel gas substitution incrementally varies with an increase in time t toward the flow rate HA1 that is determined by the hydrogen pressure during fuel gas substitution and the opening area of the hydrogen substituting valve. In the figure, a solid line indicates a time variation of the hydrogen supply flow rate HA under a situation wherein the hydrogen line is completely filled with air prior to startup operation, and a dotted line indicates a time variation of the hydrogen supply flow rate HA under another situation wherein residual hydrogen partly exists in the hydrogen line prior to startup operation.

The reason for such an increase initially caused in the hydrogen supply flow rate as residual hydrogen exists to result in an increased hydrogen concentration is that air (involving oxygen and nitrogen) has a larger molecular weight than hydrogen and, hence, a volumetric flow rate of air passing through the hydrogen substituting valve under an isobaric pressure difference is smaller than that of hydrogen.

As a consequence, the presently filed embodiment aims at the occurrence in which the hydrogen supply flow rate increases at the initial stage as residual hydrogen exists to increase the hydrogen concentration in the hydrogen line. Thus, the presently filed embodiment is configured to detect a value (that may be the hydrogen supply flow rate per se or may be a value that enables the hydrogen supply flow rate to be controlled) related to the hydrogen supply flow rate indicative of a value depending on the concentration of residual hydrogen such that, when the relevant value related to the hydrogen supply flow rate is equal to or exceeds a given level during hydrogen substituting treatment at the startup operation of the fuel cell system, fuel gas substitution is terminated so as to cause an appropriate degree of fuel substitution to be achieved in an irreducible minimum of a demand in time depending on the degree (at a concentration) of residual hydrogen remaining in the hydrogen line.

Figure 5:
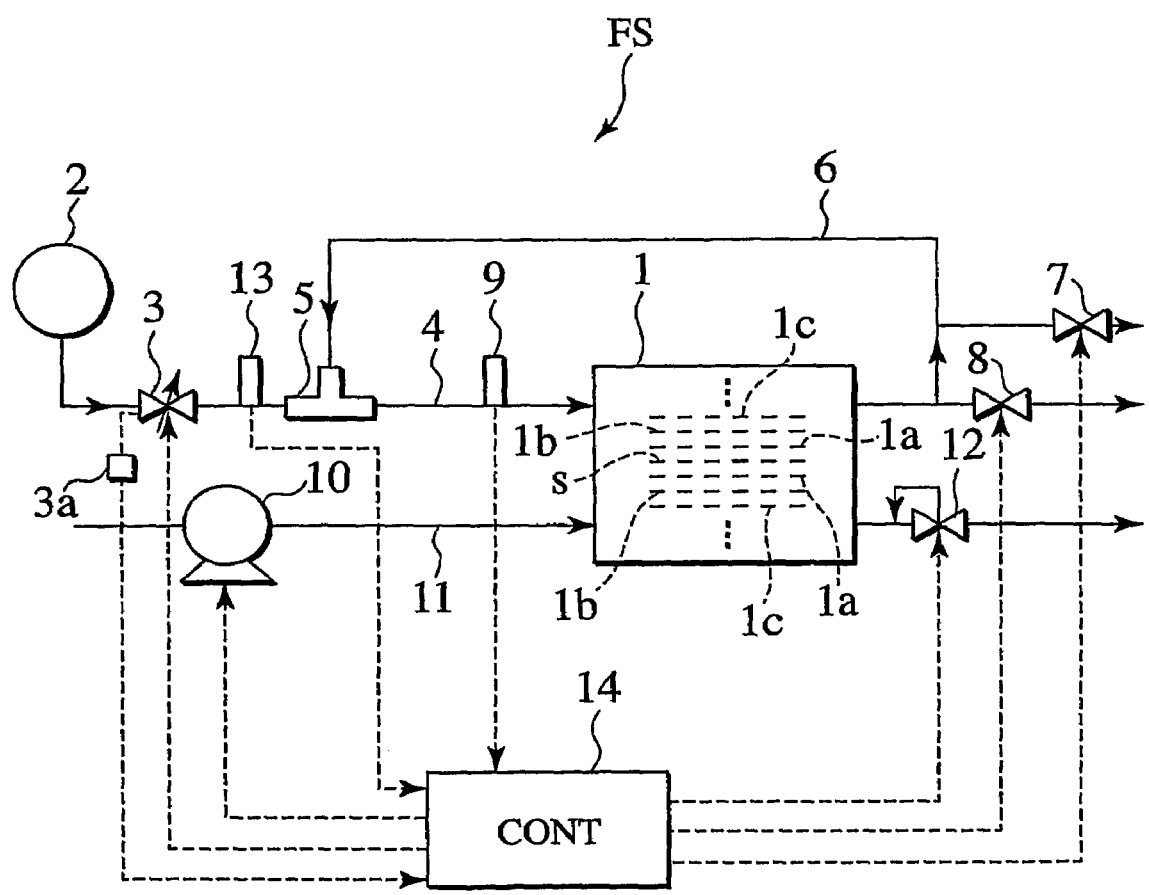
FIG. 5 is a structural view illustrating a structure of the fuel cell system in the second embodiment.
Figure 6:
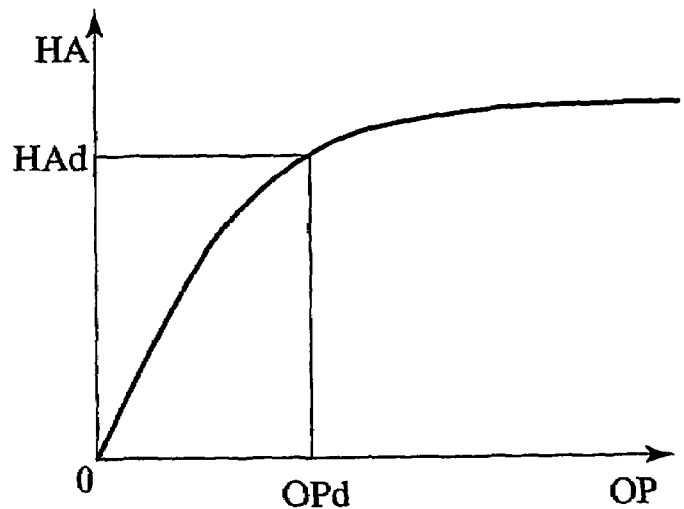
FIG. 6 is a view illustrating a hydrogen supply flow rate HA with respect to a variable-throttle-valve opening degree OP in the second embodiment.

More particularly, as shown in FIG. 5, a flow rate sensor 13, which serves as a sensor for detecting the value related to the hydrogen supply flow rate and directly detects the hydrogen supply flow rate, may be located in the hydrogen delivery pipe 4, or an opening-degree sensor 3a that detects the opening degree of the variable throttle valve 3 may be provided to the variable throttle valve 3. That is to say, since there is an intimate unique relationship between the opening degree OP of the variable throttle valve 3 and the hydrogen supply flow rate HA, detecting the opening degree of the variable throttle valve 3 allows the hydrogen supply flow rate to be detected. Moreover, adopting such a structure provides a capability of indirectly detecting the residual hydrogen concentration in the hydrogen line of the fuel cell system. Accordingly, the same component parts of the presently filed embodiment as those of the first embodiment bear the same reference numerals to omit redundant description.

Figure 7:
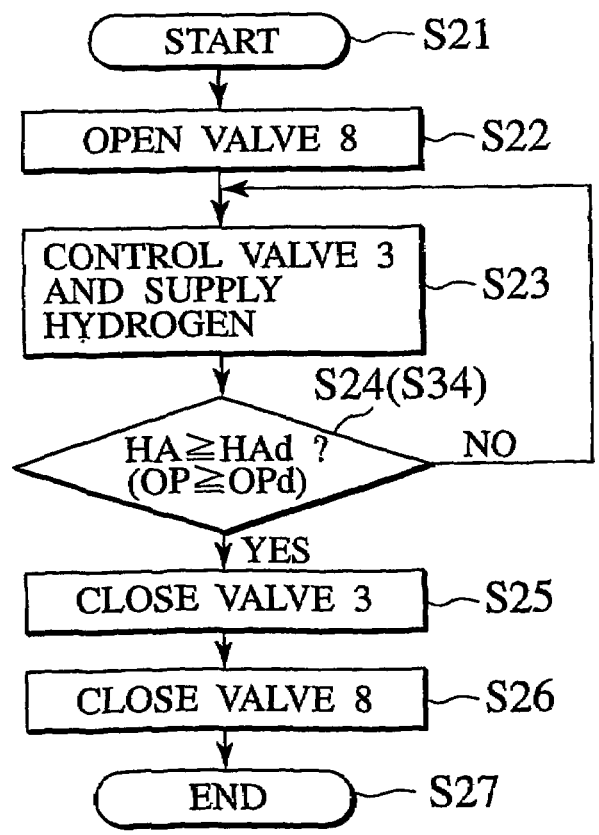
FIG. 7 is a flowchart illustrating substituting operation of fuel gas during startup of the fuel cell system in the second embodiment.

Now, a basic sequence of operation of the fuel cell system, at startup thereof, with the structure provided with the flow rate sensor 13 adapted to detect the hydrogen flow rate is described below in detail in connection with a flowchart of FIG. 7.

During such basic sequence of operation, flows from step S21 to step S23 are similar to those of step S11 to step S13 of the first embodiment.

In subsequent step S24, judgment is made to see whether the hydrogen supply flow rate HA is equal to or above the given value HAd (e.g., of approximately 100 liter/minute).

In consecutive step S24, if the hydrogen supply flow rate HA is less than the given value HAd, flow is routed back to step S23.

On the contrary, if, in judgment in step S24, the hydrogen supply flow rate HA is equal to or exceeds the given value HAd, from this time on, the variable throttle valve 3 is closed in step S25 like in the first embodiment and, in step S26, the hydrogen substituting valve 8 is closed, thereby terminating substituting treatment in step S27.

Next, a basic sequence of operation of the fuel cell system, at startup thereof, with the structure provided with the opening-degree sensor 3a adapted to detect the opening degree of the variable throttle valve 3 is described below in connection with the flowchart of FIG. 7 for the convenience's sake.

In particular, the basic sequence of operation to be performed in the structure provided with such an opening-degree sensor 3a is similar to that of operation of the structure that is provided with the flow rate sensor 13 adapted to detect the hydrogen gas flow rate with exception in that step S24, to be implemented in operation of the structure provided with the flow rate sensor 13 to detect the hydrogen gas flow rate, for executing judgment as to whether the hydrogen supply flow rate HA is equal to or exceeds the given value HAd is replaced with step S34 for executing judgment as to whether the opening degree OP of the variable throttle valve 3 is equal to or exceeds the given value OPd.

That is, if operation reaches step S34, then in judgment in step S34, if the opening degree OP is less than the given value OPd, flow is routed back to step S23.

In contrast, in judgment in step S34, if the opening degree OP is equal to or exceeds the given value OPd, from this time on, similar operations are implemented in steps S25, S26 and S27 to terminate substituting operation.

As set forth above, with the structure of the presently filed embodiment, since operation is executed to detect the value correlated with the hydrogen supply flow rate, indicative of the value depending on the fuel gas concentration in the fuel electrodes of the fuel cell body and the fuel gas passage, to allow the substituting treatment of fuel gas to be terminated based on such a resulting detected value, the time interval required for substituting hydrogen is decreased to the irreducible minimum of demand in dependence on the degree (concentration) of residual hydrogen contained in the hydrogen line, thereby enabling the fuel cell system to be reliably started up in a short time period.

Further, the ability of judgment for the degree of residual hydrogen contained in the hydrogen line from the fuel gas supply flow rate enables a simplified structure to be realized with no need for separately providing a sensor specific for detecting the hydrogen concentration.

Additionally, since the fuel gas supply flow rate is judged from the opening degree of the variable throttle valve, it is possible to discriminate when substituting operation of fuel gas has been completed without using a flow meter with high precision.

Third Embodiment

Now, a fuel cell system and its related method of a third embodiment of the present invention are described in detail with reference to FIG. 8.

The presently filed embodiment is configured in consideration of a probability wherein, in the second embodiment, if the flow rate sensor 13 for detecting the hydrogen gas flow rate in the hydrogen delivery pipe 4 or the opening-degree sensor 3a, which detects the opening degree of the variable throttle valve 3, have insufficient detecting precisions, hydrogen substituting treatment is apt to be terminated even though hydrogen substituting treatment is not sufficiently performed, or a probability wherein, if a detecting precision of the opening-degree sensor 3a is not adequate, a difficulty is encountered by the opening-degree sensor 3a in detecting the presence of a sufficiently large opening degree of the valve and hydrogen substituting treatment is not terminated even though an actual hydrogen flow rate is sufficiently increased. Also, the structure per se of the fuel cell system of the presently filed embodiment is similar to that of the second embodiment Accordingly, the presently filed embodiment is arranged such that, in stead of using threshold value of the given value HAd of the hydrogen supply flow rate HA or the given value OPd of the opening degree OP of the variable throttle valve 3, at which judgment is made to see whether hydrogen substituting operation is completed in the second embodiment, with another given value HAd or OPd selected to be at a lower level than that of the second embodiment, fuel gas substituting treatment is continued for a prolonged length of given time (e.g., of approximately three seconds) even after the hydrogen supply flow rate HA or the opening degree HA becomes equal to or exceeds each threshold value selected to be at such a lower level.

Figure 8:
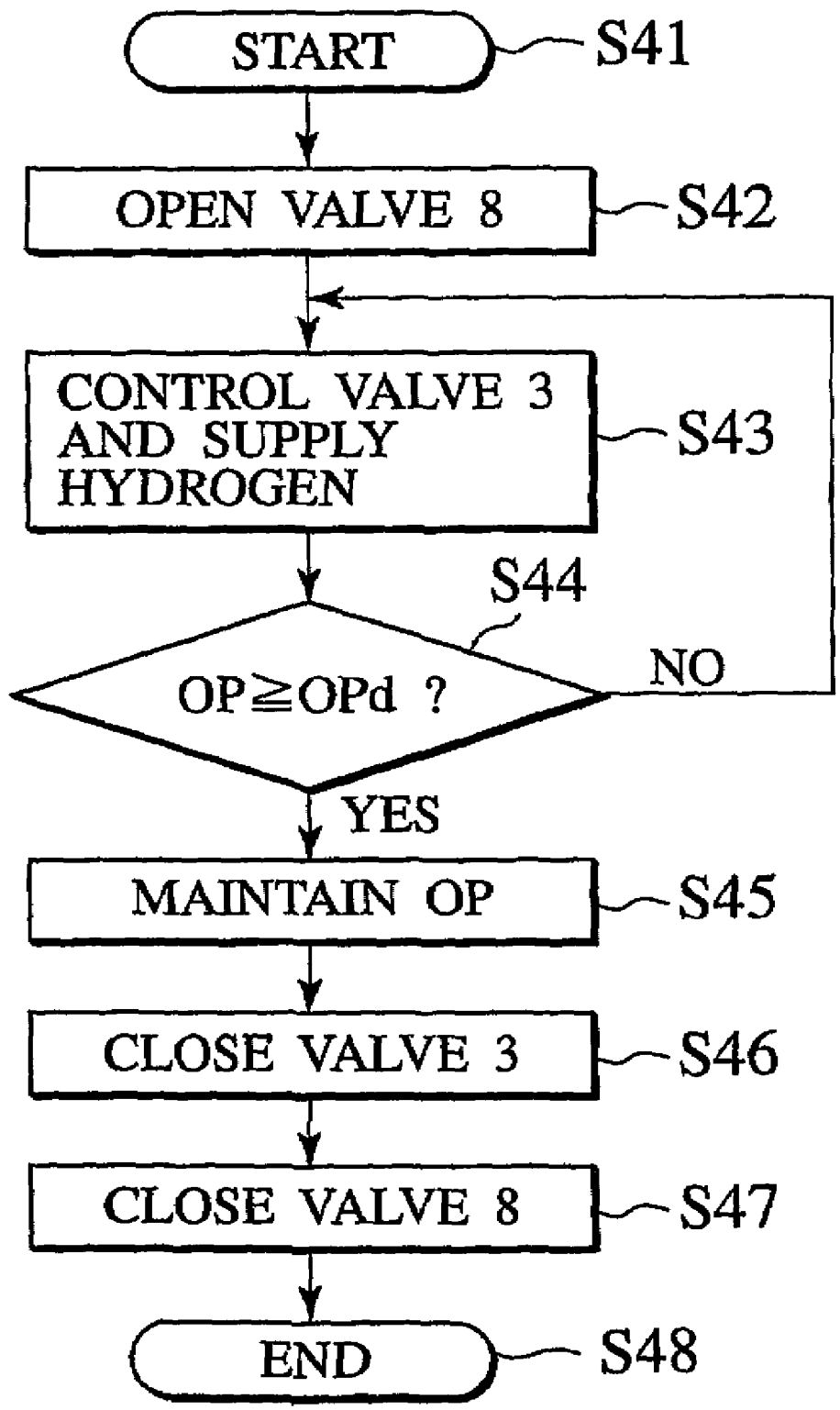
FIG. 8 is a flowchart illustrating substituting operation of fuel gas during startup of a fuel cell system of a third embodiment according to the present invention.

A basic sequence of operation to be executed in such a structure is concretely shown in a flowchart of FIG. 8. Also, in FIG. 8, while an attempt is made to allow the opening degree OP of the variable throttle valve 3 to be continued for a given time interval, this concept may also be similarly applied to the hydrogen supply flow rate HA.

The flowchart of FIG. 8 is similar to that of the second embodiment in terms of steps S41 to S43 and steps S21 to S23 with only exception in that operation of step S45 is newly added to those steps in the second embodiment, and steps S46 to S48 are similar to steps S25 to S27. That is, in step S45, even after the opening degree OP of the variable throttle valve 3 increases beyond the given value OPd in step S44, such an opening degree is maintained for the given time interval in which operation is executed to continue substituting treatment of fuel gas.

As described above, since the presently filed embodiment is structured so as to allow fuel gas substituting treatment to be terminated after an elapse of the given time interval when the opening degree of the variable throttle valve exceeds the given value, it becomes possible to reliably start up the fuel cell system in a short period even when using a low cost valve by which low degrees of detecting precision for the hydrogen supply flow rate or the opening degree of the variable throttle valve are provided.

Fourth Embodiment

Now, a fuel cell system and its related method of a fourth embodiment of the present invention are described in detail with reference to FIGS. 9 to 12.

Figure 9:
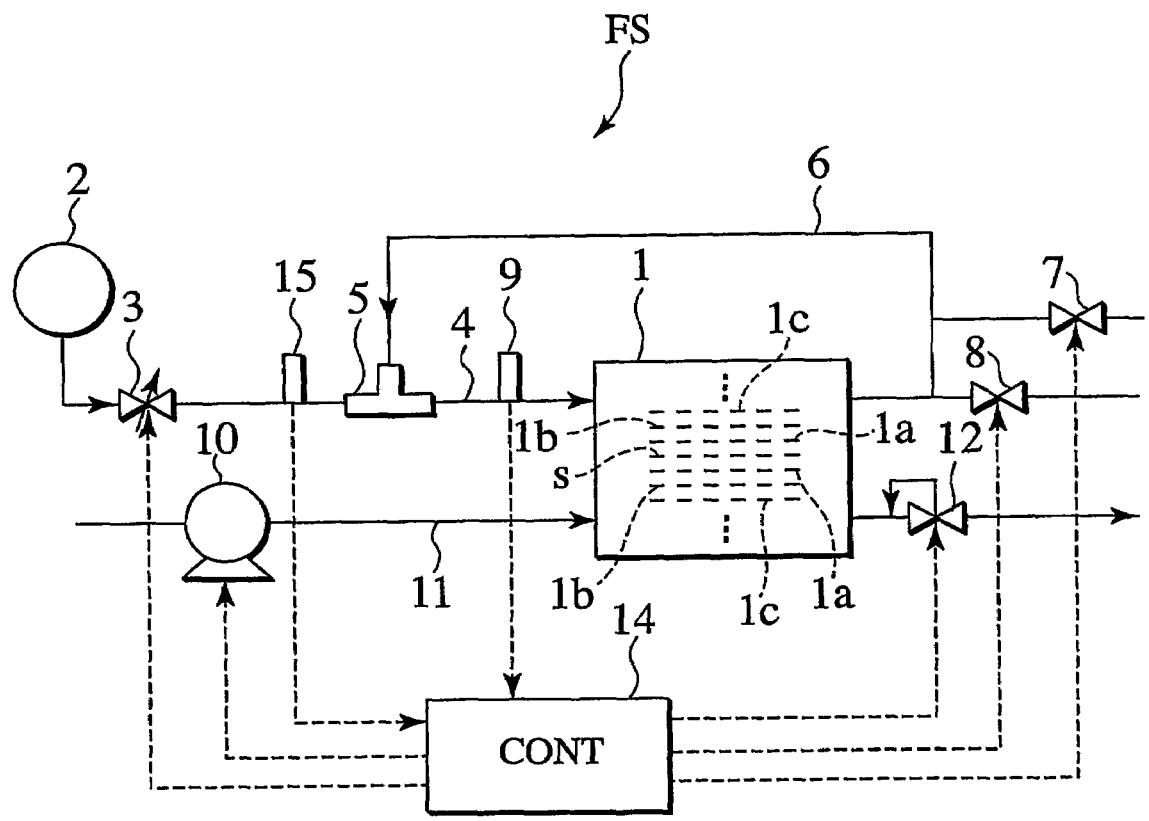
FIG. 9 is a structural view illustrating a structure of a fuel cell system of a fourth embodiment according to the present invention.

FIG. 9 is a structural view illustrating a structure of the fuel cell system of the presently filed embodiment.

As shown in FIG. 9, the presently filed embodiment differs from the first embodiment in that a pressure sensor 15 is newly added to a position upstream of the ejector 5 for detecting a fuel gas pressure (an inlet pressure of the ejector 5) and is similar in other structure to the first embodiment. Thus, the same component parts bear the same reference numerals to omit redundant description. Of course, the presently filed embodiment may be based on the structure shown in FIG. 3.

Figure 10:
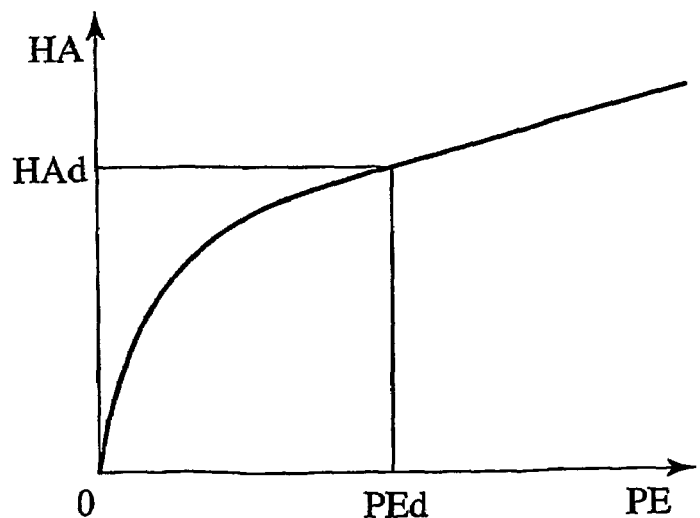
FIG. 10 is a view illustrating the hydrogen supply flow rate HA with respect to an ejector inlet pressure PE of the fuel cell system in the fourth embodiment.

Here, since the ejector 5 has an inlet with a nozzle which serves as restriction to cause a pressure loss, as shown in FIG. 10, there is a unique relationship between an inlet pressure PE of the ejector 5 and the hydrogen supply flow rate HA. As a consequence, it appears that detecting the inlet pressure of the ejector 5 enables the hydrogen supply flow rate to be detected. From such a standpoint, the presently filed embodiment contemplates to utilize the inlet pressure PE of the ejector 5 detected by the pressure sensor 15 for thereby achieving hydrogen substituting treatment.

Figure 11:
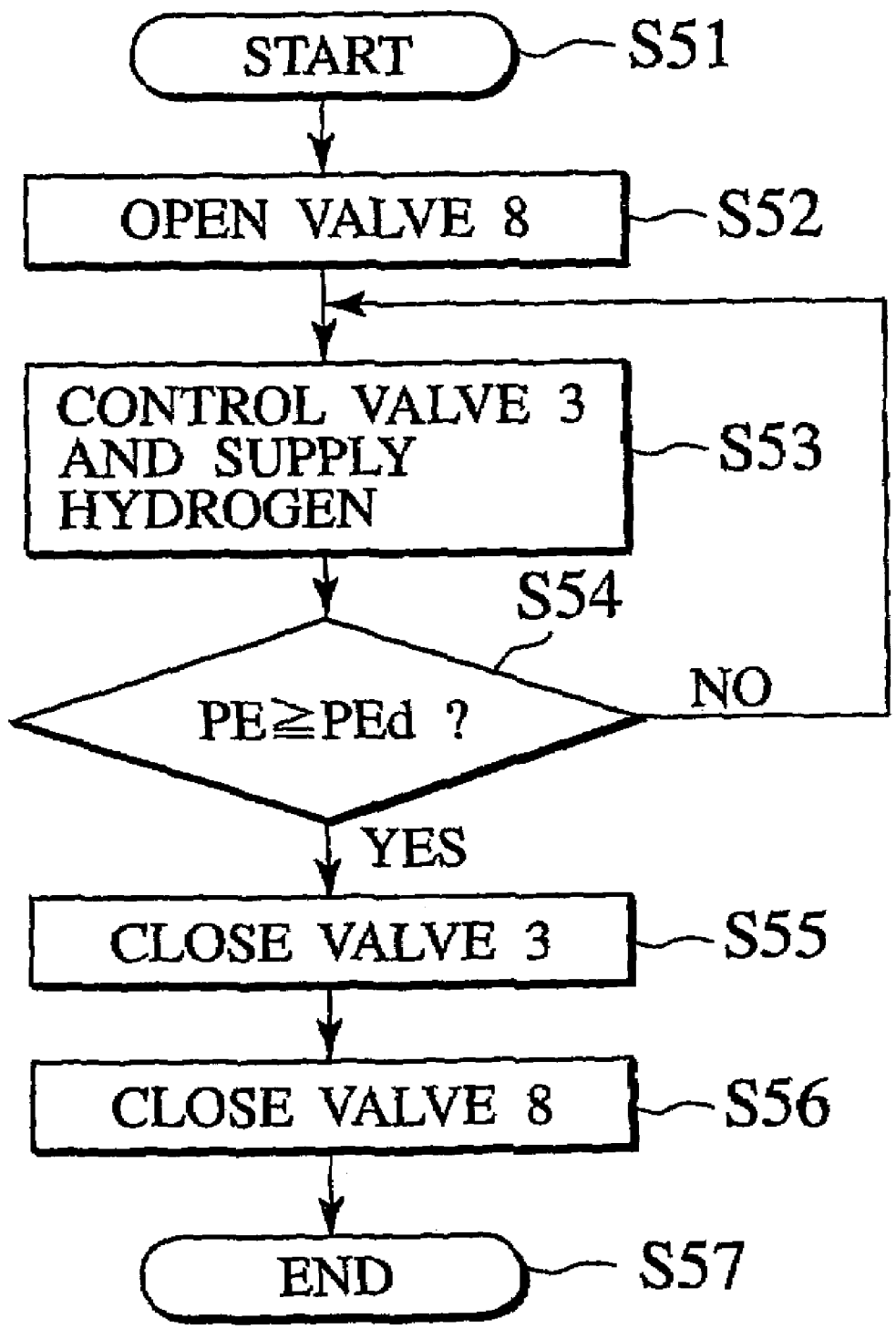
FIG. 11 is a flowchart illustrating substituting operation of fuel gas during startup of the fuel cell system in the fourth embodiment.

A basic sequence of operation of such structure is particularly shown in detail in a flowchart of FIG. 11.

In FIG. 11, operations in steps S51 to S53 are executed in the same way as those in steps S21 to S23 of the second embodiment and, in place of step S24 or S34, discrimination is made in step S54 to see whether the ejector inlet pressure PE detected by the pressure sensor 15 is equal to or beyond a given value PEd (e.g., of approximately 1 bar). If, in this case, the ejector inlet pressure PE is equal to or exceeds the given value PEd, from this time on, operations in steps S55 to S57 are executed in the same way as those in steps S25 to S27 of the second embodiment, thereby terminating hydrogen substituting treatment.

By the way, in the presently filed embodiment, it is conceivable that, if the pressure sensor 15 disposed upstream the ejector 5 has an insufficient detecting precision, there are probabilities where hydrogen substituting treatment is terminated before adequate hydrogen substitution is performed or where hydrogen substituting treatment is not terminated even when adequate hydrogen substitution is achieved.

Figure 12:
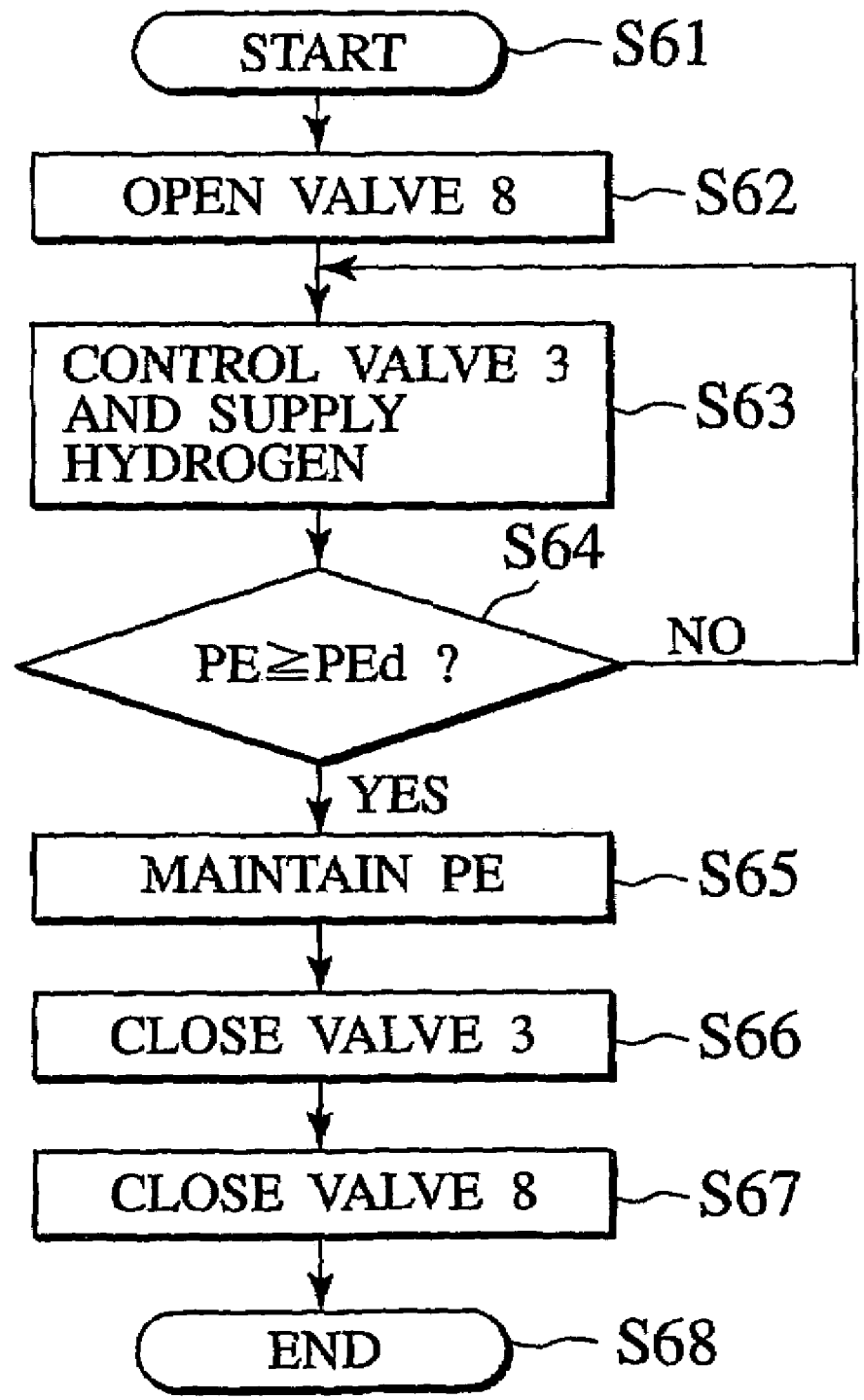
FIG. 12 is a flowchart illustrating another example of substituting operation of fuel gas during startup of the fuel cell system in the fourth embodiment.

In such probabilities, as shown in detail in a flowchart of FIG. 12, by adding step S65 to the flowchart of FIG. 11 to provide a capability wherein, after the ejector inlet pressure PE detected by the pressure sensor 15 in step S64 has been equal to or exceeded the given value PEd (e.g., at a value, of approximately 0.8 bar, lower than the threshold value in FIG. 11), the ejector inlet pressure is maintained at such a level for a given time interval (e.g., of approximately three seconds) to continue hydrogen substituting treatment in step S65, the fuel cell system can be reliably started up in a short time period even when using a low cost pressure sensor. Also, operations in steps S61 to S63 in FIG. 12 are similar to those in steps S51 to S53 in FIG. 11, and operations in steps S66 to S68 in FIG. 12 are similar to those in steps S55 to S57 in FIG. 11.

As previously noted above, since the presently filed embodiment is structured to have the pressure sensor 15 for detecting the fuel gas pressure upstream of the ejector while permitting fuel gas substituting treatment to be terminated based on the fuel gas pressure detected by the pressure sensor 15, utilizing a characteristic of an existing ejector enables the fuel cell system to be started up in a simple and reliable manner in a short time period.

Further, since the presently filed embodiment is arranged to cause fuel gas substituting treatment to be terminated after an elapse of the given time interval when the ejector inlet pressure detected by the pressure sensor 15 exceeds the given value, the use of low cost pressure sensor with an inadequate precision for detecting the gas pressure enables the fuel cell system to be reliably started up in the short time period.

Fifth Embodiment

Next, a fuel cell system and its related method of a fifth embodiment of the present invention are described in detail with reference to FIGS. 13 to 14.

Figure 13:
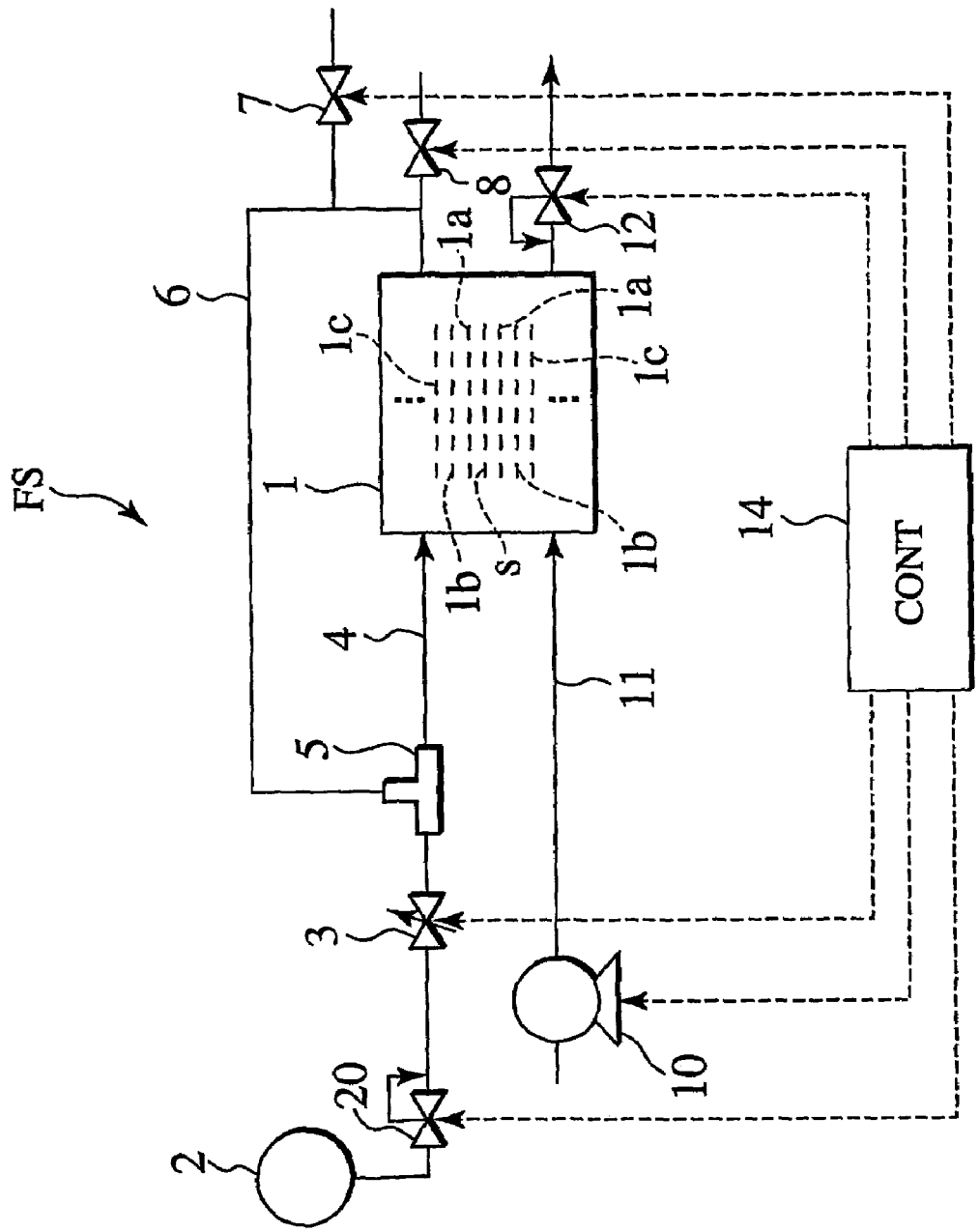
FIG. 13 is a structural view illustrating a structure of a fuel cell system of a fifth embodiment according to the present invention.

FIG. 13 is a structural view illustrating a structure of the fuel cell system of the presently filed embodiment.

As shown in FIG. 13, the fuel cell system of the presently filed embodiment differs from that of the first embodiment in that a pressure regulator 20 is disposed between the hydrogen tank 2 and the variable throttle valve 3 to achieve control of hydrogen gas in a way to be supplied to the variable throttle valve 3 at a constant pressure level regardless of residual pressure in the hydrogen tank 2 and is identical to the first embodiment in other structure. Thus, the same component parts bear the same reference numerals to omit redundant description. Also, the pressure sensor 9 disposed in the hydrogen delivery pipe 4 in the first embodiment is unnecessary and so omitted. Of course, the presently filed embodiment may be based on the structure shown in FIG. 3.

Now, a basic sequence of operation of such a structure is described below in detail with reference to a flowchart shown in FIG. 14.

Figure 14:
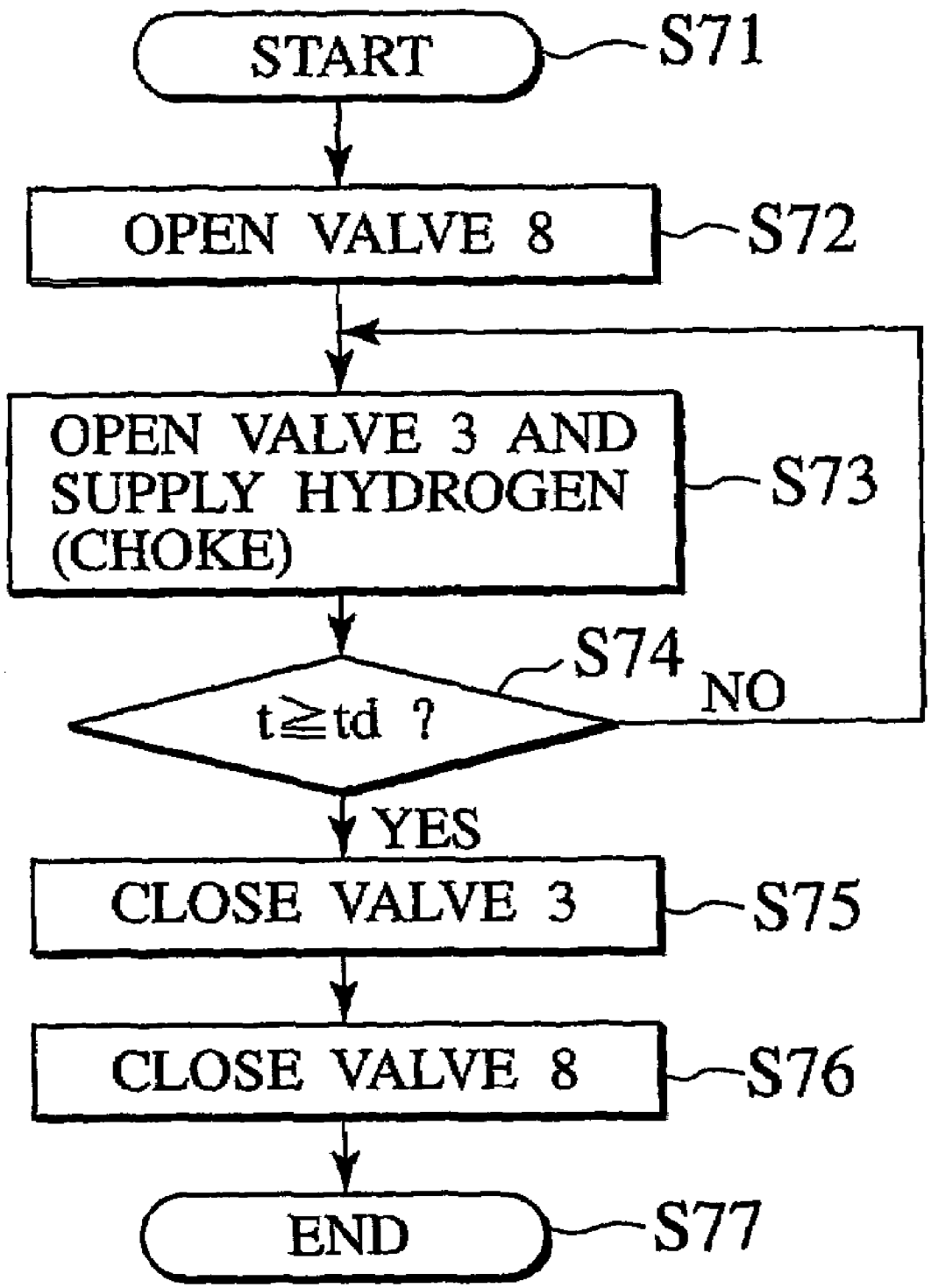
FIG. 14 is a flowchart illustrating substituting operation of fuel gas during startup of the fuel cell system in the fifth embodiment.

As shown in FIG. 14, the basic sequence of operation of the presently filed embodiment is fundamentally similar to that of the first embodiment. In particular, operations in steps S71 and S72 are similar to the operations in steps S11 and S12 and, in consecutive step S73, hydrogen is supplied to the fuel cell system at a substantially constant flow rate (e.g., of approximately 100 liter/minute), thereby achieving hydrogen substituting treatment to cause residual gas in the hydrogen line, involving the hydrogen delivery pipe 4, the fuel electrode interiors and the hydrogen delivery pipe 6, to be replaced with newly supplied hydrogen. However, in the presently filed embodiment, the opening degree of the variable throttle valve 3 is fixed to be maintained at a constant opening degree to permit hydrogen to be supplied at a constant flow rate during hydrogen substituting operation. If the ratio between the hydrogen pressure upstream of the variable throttle valve 3 and the hydrogen pressure at the downstream thereof is equal to or exceeds a value of 1.9, the variable throttle valve 3 assumes a so-called choke condition. Accordingly, if the setting pressure of the pressure regulator 20 is maintained at a sufficiently high level, even when the opening degree of the variable throttle valve 3 is maintained at the constant level, the hydrogen supply flow rate becomes constant without being adversely affected by the pressure downstream of the variable throttle valve 3. With such a structure, since there is no need for variably controlling the opening degree of the variable throttle valve 3, the pressure sensor 9 disposed in the hydrogen delivery pipe 4 in the first embodiment becomes unnecessary and can be omitted. Also, operations in subsequent steps S74 to S77 in FIG. 14 are similar to those of steps S14 to S17 in FIG. 2.

As set forth above, with the structure of the presently filed embodiment, since hydrogen substitution can be necessarily and adequately carried out in the fuel gas supply passage and the fuel electrode interiors in a reliable manner during startup operation, it is possible to reliably start up the fuel cell system even when the system has been left for a long time period.

Especially, maintaining the fuel-gas supply flow rate at the substantially constant level enables judgment, on the basis of an elapse of the given time interval, in that adequate hydrogen substitution is performed, thereby enabling the above-described advantageous effects in a simplified control.

Also, maintaining the opening degree of the variable throttle valve at the constant level allows the fuel-gas supply flow rate to be maintained at the substantially constant level, resulting in a further simplified control structure.

Sixth Embodiment

Next, a fuel cell system and its related method of a sixth embodiment of the present invention are described in detail with reference to FIGS. 15 to 17.

Figure 15:
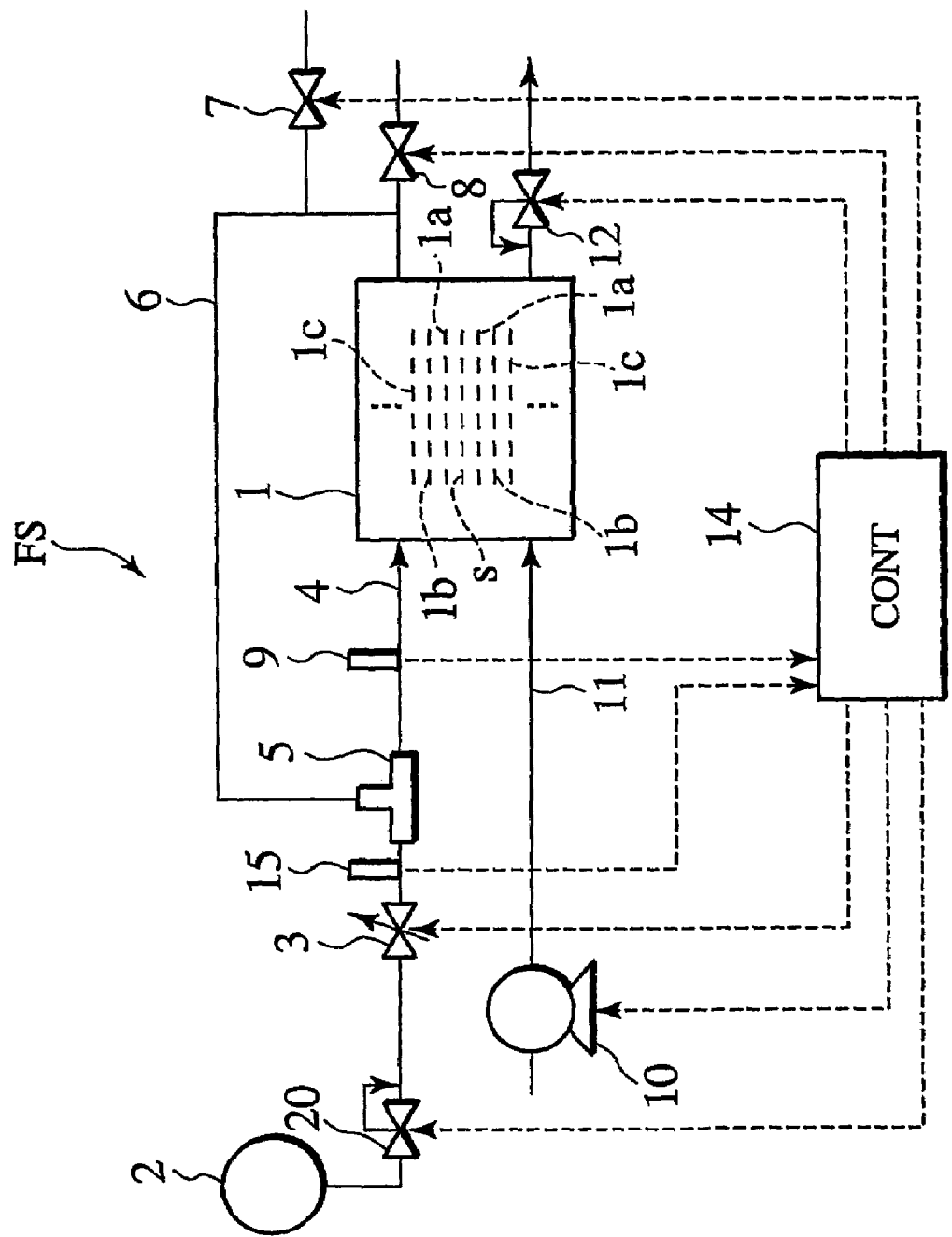
FIG. 15 is a structural view illustrating a structure of a fuel cell system of a sixth embodiment according to the present invention.

FIG. 15 is a structural view illustrating a structure of the fuel cell system of the presently filed embodiment.

As shown in FIG. 15, the fuel cell system of the presently filed embodiment differs from that of the fifth embodiment in that a pressure sensor 15 is disposed between the variable throttle valve 3 and the ejector 5 to detect the fuel gas pressure (ejector inlet pressure) upstream of the ejector 5 and the pressure sensor 9 is disposed between the ejector 5 and the fuel cell system 1 to detect the hydrogen pressure to be supplied to the fuel cell system 1 whereas the presently filed embodiment is similar to the fifth embodiment in other structure, and the same component parts bear the same reference numerals to omit redundant description.

In particular, the structure of the presently filed embodiment is configured such that, in addition to control to be performed by the first embodiment, the controller 14 is further operative to control the opening degree of the variable throttle valve 3 in a way in which, when executing hydrogen substituting treatment during startup operation of the fuel cell system, the ejector inlet pressure to be detected by the pressure sensor 15 is maintained at a constant level (e.g., of approximately 0.5 bar). That is, the ejector 5 has a restricted flow passage due to a nozzle at the inlet of the ejector and, hence, a pressure loss occurs when flowing hydrogen through the ejector 5. This is because of the fact that, by setting the ejector inlet pressure, occurring during hydrogen substituting operation, at the high level in order to utilize such a pressure loss to cause the ejector 5 to assume the choke condition while controlling the hydrogen pressure upstream of the ejector 5 at the constant level, the hydrogen supply flow rate at the downstream of the ejector 5 becomes constant, with a resultant capability of maintaining the hydrogen supply flow rate at the constant level during hydrogen substituting operation in a more reliable manner. Also, the pressure sensor 9 is configured to detect the hydrogen pressure at the downstream of the ejector 5 for the purpose of confirmation, and the controller 14 is configured to control the opening degree of the variable throttle valve for a supplemental purpose such that the ejector 5 reliably assumes the choke condition.

Now, a basic sequence of operation of such a structure is described below in detail with reference to a flowchart shown in FIG. 16.

Figure 16:
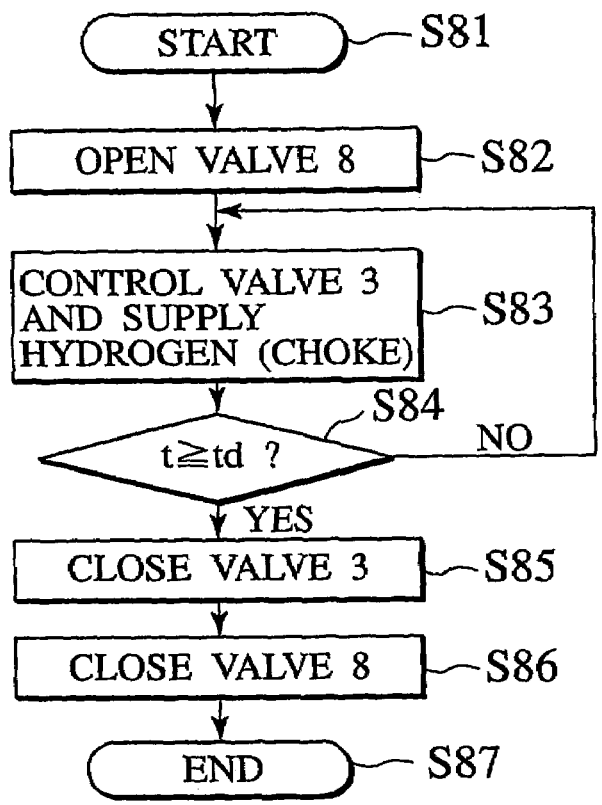
FIG. 16 is a flowchart illustrating substituting operation of fuel gas during startup of the fuel cell system in the sixth embodiment.

As shown in FIG. 16, the basic sequence of operation of the presently filed embodiment is fundamentally similar to that of the first embodiment. In particular, operations in steps S81 and S82 in FIG. 16 are similar to the operations in steps S71 and S72 in FIG. 14 and, in consecutive step S83, hydrogen is supplied to the fuel cell system while regulating the opening degree of the variable throttle valve 3 so as to allow the inlet pressure of the ejector 5, detected by the pressure sensor 15, to be maintained at a given value. Also, operations in subsequent steps S84 to S87 in FIG. 16 are similar to those of steps S74 to S77 in FIG. 14.

Well, it is conceivable that there are some probabilities wherein, depending on the size of the nozzle of the ejector 5 and the hydrogen substituting flow rate, the ejector 5 becomes hard to assume the choke condition during hydrogen substituting operation. That is, the size of the ejector 5 should be determined according to the flow rate of hydrogen that, to be circulated by the ejector 5 during the normal operating condition, where the flow rate of hydrogen should be determined by the characteristic of the fuel cell stack. Also, since the higher the hydrogen substituting flow rate, the larger will be the amount of hydrogen to be discharged and, hence, a combustor (not shown) for combusting discharged hydrogen is caused to be largely sized with a resultant deterioration in fuel consumption, the hydrogen substituting flow rate cannot be set at an extremely high level. As a consequence, when using the ejector 5 having a large nozzle surface area and setting the hydrogen substituting flow rate at a reduced level, it is conceivable that there is a probability wherein, during hydrogen substituting operation, the ejector 5 comes to be hard to be maintained in the choke condition.

Figure 17:
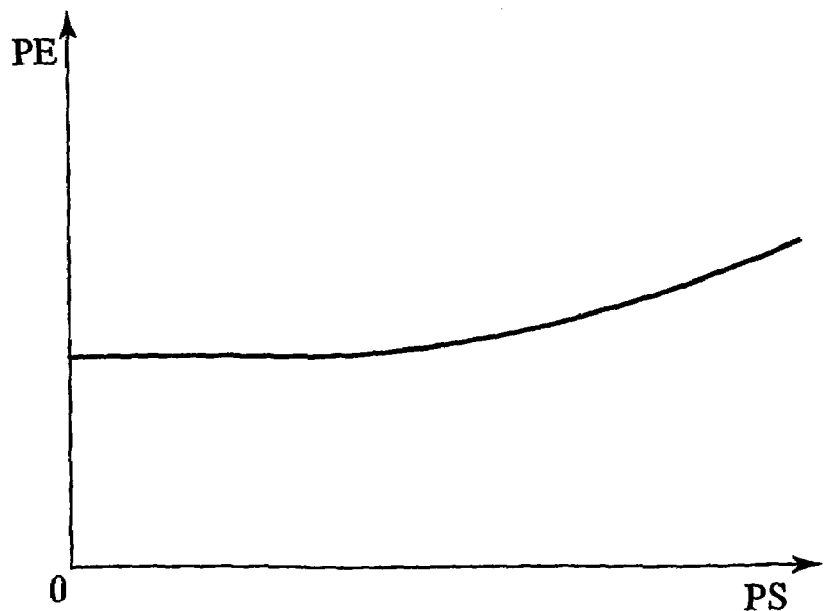
FIG. 17 is a view illustrating an ejector inlet pressure PE, in which the hydrogen supply flow rate assumes a given value, with respect to an inlet pressure PS of a fuel cell stack of the fuel cell system in the sixth embodiment.

In such a case, as shown in FIG. 17, the controller 14 is configured to preliminarily store the ejector inlet pressure, by which the hydrogen substituting flow rate is maintained at the given fixed valve, in dependence on the inlet pressure (equivalent to the pressure downstream of the ejector) of the fuel cell stack 1. Then, if the controller 14 controls the variable throttle valve 3 so as to cause the ejector inlet pressure, detected by the pressure sensor 15, in consideration of the detected pressure of the pressure sensor 9 while detecting the downstream pressure of the ejector 5, that is, the inlet pressure of the fuel cell stack 1 by the pressure sensor 9 during hydrogen substituting operation, it is possible to have the same situation as that wherein the ejector 5 is maintained in the choke condition.

As set forth above, according to the structure of the presently filed embodiment, like the fifth embodiment, since hydrogen substitution can be necessarily and adequately performed during startup operation in a reliable manner, reliable startup of the system can be achieved.

Especially, by using the existing ejector and utilizing the characteristic of the ejector which serves to choke while regulating the opening degree of the variable throttle valve so as to cause the fuel gas pressure upstream of the ejector to be substantially constant, the fuel-gas supply flow rate can be maintained at the substantially constant level in a simple and reliable manner.

Further, since the fuel gas pressure upstream of the ejector is determined depending on the fuel gas pressure downstream of the ejector, the fuel-gas supply flow rate can be rendered to be substantially constant in a simple and reliable manner even in the presence of fluctuations in the fuel gas pressure downstream of the ejector.

Also, it can be said that the pressure sensor 15 for detecting the inlet pressure of the ejector 5 also plays as a role to detect its corresponding fuel gas concentration.

Seventh Embodiment

Next, a fuel cell system and its related method of a seventh embodiment of the present invention are described in detail with reference to FIGS. 18 to 19.

The fuel cell system of the presently filed embodiment is similar to that of the sixth embodiment and, on the basis of such a structure, the inlet pressure of the fuel cell stack 1 during hydrogen substituting operation was conducted.

Figure 18:
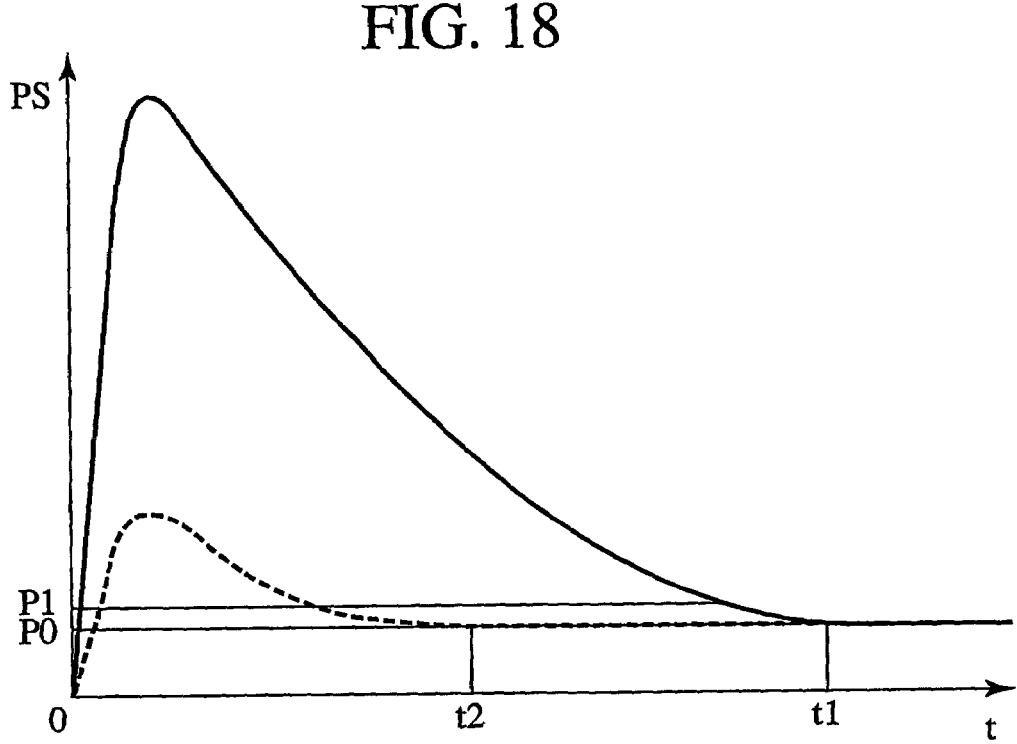
FIG. 18 is a view illustrating a time variation of an inlet pressure PS of a fuel cell stack during substituting operation in a fuel cell system of a seventh embodiment according to the present invention.

FIG. 18 shows variations in the inlet pressure (equivalent to the pressure downstream of the injector 5) of the fuel cell stack 1 during hydrogen substituting operation in terms of time variations. In the figure, a solid line shows variations in the inlet pressure of the fuel cell stack 1 in terms of time variations in a case where the hydrogen line of the fuel cell system is fully filled with air and nitrogen prior to the fuel cell system being started up and, therefore, the longest length of time is needed for hydrogen substitution whereas, on the contrary, if the hydrogen line is filled with a small amount of residual air and nitrogen, that is, under a situation with residual hydrogen, the inlet pressure varies as shown by a dotted line. Namely, in a case, as shown by the solid line, where the hydrogen line is filled with air and nitrogen, there is a need for hydrogen substituting treatment to be performed for a time interval of t1, whereas when residual hydrogen exists in the case as shown by the dotted line, it suffices to carry out hydrogen substituting treatment for a time interval of t2 (t2<t1).

In FIG. 18, once hydrogen substituting treatment begins to be carried out to start supply of hydrogen, the inlet pressure of the fuel cell stack 1 builds up once and decreases as hydrogen substitution proceeds whereupon when the hydrogen is fully filled with hydrogen, the pressure remains at the substantially constant level (e.g., of P0: 3 kPa). This seems to be a phenomenon owing to the fact in that air has a larger molecular weight than hydrogen and, when substituting air with hydrogen at the constant flow rate, the air pressure built up during passing through the hydrogen substituting valve 8 is higher than hydrogen. That is to say, it is meant that when performing substitution at the constant flow rate, the use of the inlet pressure of the fuel cell stack, i.e., the use of the pressure downstream of the ejector 5, enables judgment to be made as to which extent air and nitrogen remains in the hydrogen line.

In view of the above considerations, the presently filed embodiment is arranged to terminate substitution at the time when the inlet pressure of the fuel cell stack 1 is equal to or drops below the given value (P0) during hydrogen substituting operation. Namely, occurrence of the inlet pressure of the fuel cell stack 1 such that it is equal to or drops below the given value (P0) is considered to assume a situation wherein the hydrogen concentration in the hydrogen line, such as the fuel electrode interiors and the fuel gas passage, is equal to or increases beyond the given value (i.e., at the minimum hydrogen concentration required for electric power generation). In such a case, it is said that the pressure sensor 9 for detecting the pressure downstream of the ejector 5 also plays as a role to detect the hydrogen concentration, that is, the fuel gas concentration.

Now, a basic sequence of operation of such a structure is described below in detail with reference to a flowchart shown in FIG. 19.

Figure 19:
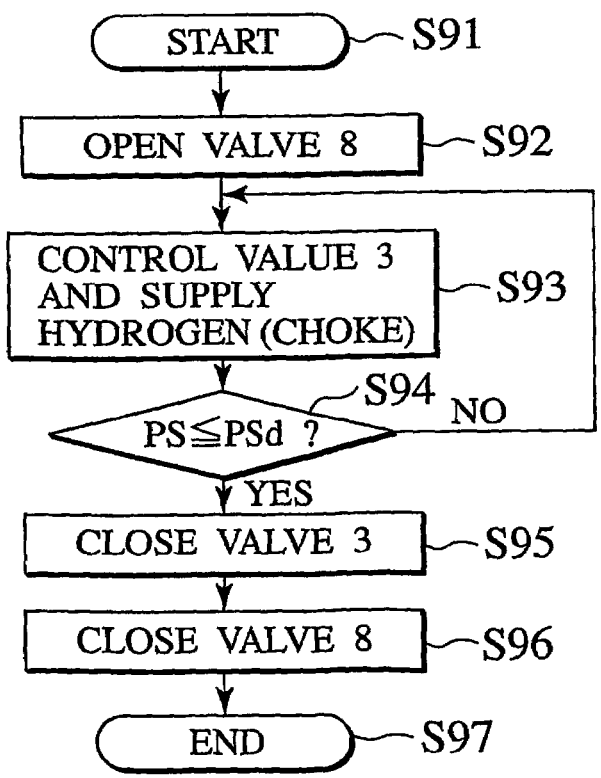
FIG. 19 is a flowchart illustrating substituting operation of fuel gas during startup of the fuel cell system in the seventh embodiment.

In FIG. 19, the basic sequence of operation of the presently filed embodiment includes the same operations in steps S91 to S93 as those in steps S81 to S83 of the sixth embodiment and, in consecutive step S94 in place of step S84, judgment is made to see whether the inlet pressure PS of the fuel cell stack 1 detected by the pressure sensor 9 is equal to or less than the given vale of PSd (=P0). If the inlet pressure PS of the fuel cell stack 1 is equal to or less than the given vale of PSd, then steps S95 to S97 are carried out in the same operations as steps S85 to S87 of the sixth embodiment to terminate hydrogen substituting treatment.

As described above, according to the structure of the presently filed embodiment, it is possible to obtain the substituting time interval of the irreducible minimum of demand depending on the residual hydrogen concentration in the hydrogen line of the fuel cell system, providing a capability of minimizing the amount of hydrogen to be lost due to substitution while initiating startup in a reliable manner while providing a shortened startup time for the system.

Further, the presence of an ability of discriminating the residual hydrogen quantity (concentration) in the hydrogen line based on the gas pressure value upstream of the hydrogen substituting valve enables the need for using the sensor specific for the hydrogen concentration to be dispensed with.

Furthermore, the presence of control of the fuel gas flow rate at the substantially constant value provides an ease of discriminating a condition in that the pressure upstream of the hydrogen substituting valve is equal to or drops below the given value in accordance with an increase in fuel gas prevailing in the fuel electrode interiors and the fuel gas passage. If the fuel gas flow rate cannot be maintained at the substantially constant level, even when the pressure upstream of the hydrogen substituting valve is equal to or drops below the given value, a difficulty is encountered in discriminating whether the pressure drop derives from the increase in the fuel gas in the fuel electrode interiors and the fuel gas passage or whether the pressure drop is caused by fluctuations in the fuel gas flow rate per se, resulting in reduction in a reliability of substituting treatment.

Moreover, in the presently filed embodiment, the pressure sensor 9 for detecting the pressure downstream of the ejector, that is, the inlet pressure of the fuel cell stack is used, it is naturally idealistic to provide the pressure sensor at the inlet of the hydrogen substituting valve for the purpose of using the inlet pressure of the hydrogen substituting valve. However, if the pressure loss in the fuel cell stack is sufficiently low, it may be suitably replaced with the inlet pressure of such fuel cell stack. That is to say, the pressure sensor may be located downstream of the fuel cell stack provided that the pressure sensor is located downstream of the ejector.

Additionally, although the substituting flow rate is arranged to be constant by maintaining the ejector inlet pressure at the constant level, it may be altered such that the substituting flow rate is arranged to be constant by maintaining the opening degree of the variable throttle valve at a constant value.

Eighth Embodiment

Figure 20:
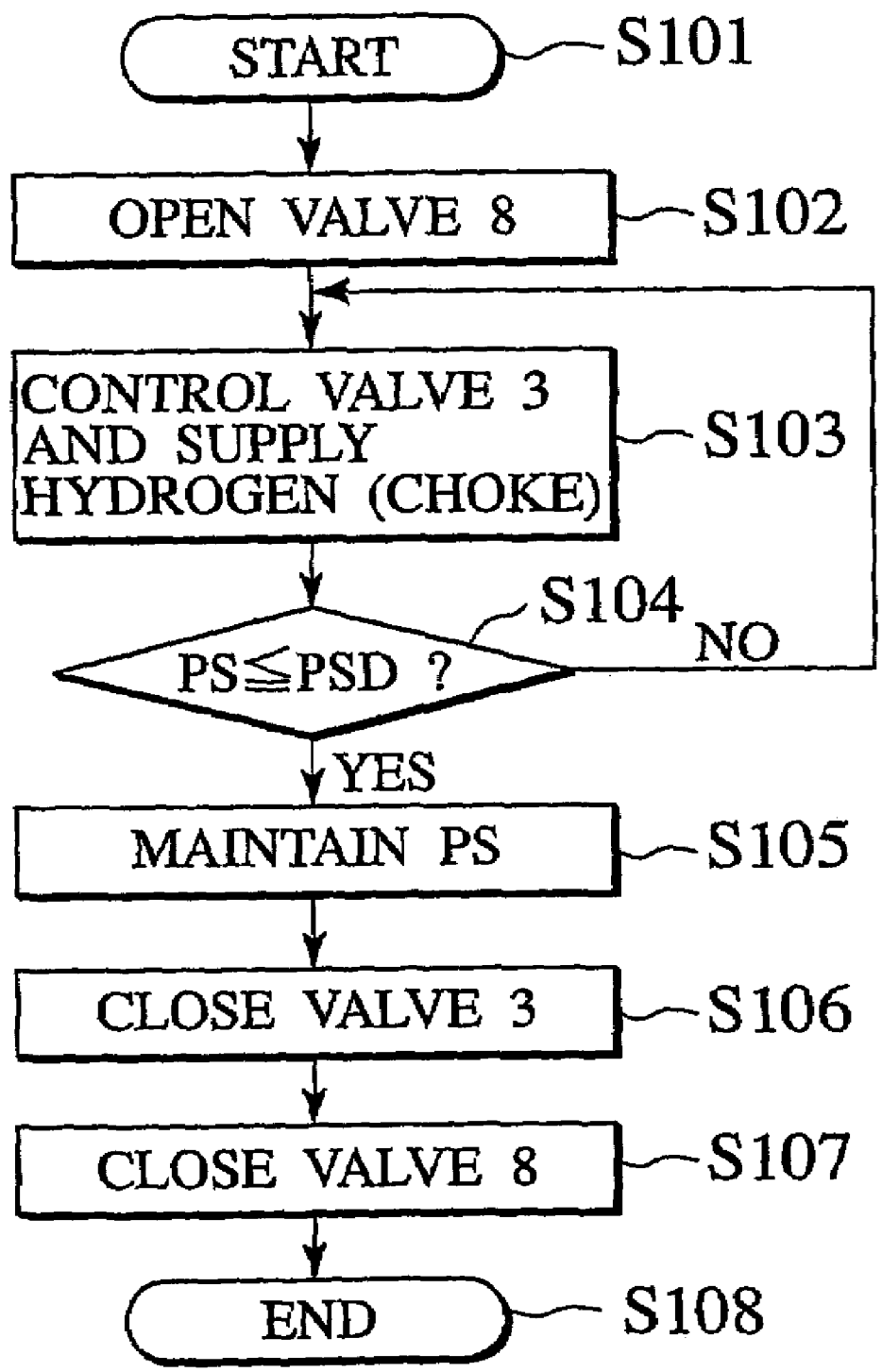
FIG. 20 is a flowchart illustrating substituting operation of fuel gas during startup of a fuel cell system of an eighth embodiment according to the present invention

Next, a fuel cell system and its related method of an eighth embodiment of the present invention are described in detail with reference to FIG. 20. The fuel cell system of the presently filed embodiment is similar to that of the sixth embodiment.

In the structure of the above-described seventh embodiment, if the hydrogen substituting flow rate, i.e., typically, the hydrogen substituting valve is set to the value to cause the inlet pressure of the fuel cell stack 1 during hydrogen substituting operation to rise to the maximum level of approximately 40 kPa in the case where the hydrogen line is filled with air and nitrogen, such an inlet pressure reaches a value of approximately 3 kPa. That is to say, there is a need to resist the maximum pressure of 40 kPa and to detect the low pressure, such as the value of 3 kPa, at a high precision and, to this end, it is necessary to use a pressure sensor at a high cost. In a case where the pressure sensor has a low precision, it is predicted that there are probabilities wherein it is discriminated that substitution is terminated even in the absence of a sufficient degree of substitution or wherein the pressure becomes hard to drop to the value of PSd (=P0) in terms of an indicated value of the sensor and substituting treatment comes to be hard to be terminated.

To overcome these occasions, the presently filed embodiment contemplates to employ a pressure that, for judging substitution being terminated, is settled at a higher value of P1 (e.g., 6 kPa) than the value of P0 in FIG. 18 and, in place thereof, is configured to continue supply of hydrogen for the given time interval (e.g., for about three seconds) even when the inlet pressure of the fuel cell stack is equal to or drops below P1.

In such a case, as shown in a flowchart of FIG. 20, by adding step S105 to the flowchart of FIG. 19 whereupon, after the inlet pressure PS of the duel cell stack 1 detected by the pressure sensor 9 in step S104 is equal to or drops below the given value PSd (e.g., of about 6 kPa that is slightly higher than the threshold value in FIG. 18), such an inlet pressure is maintained for the given time interval (e.g., of about three seconds) in step S65 to continue hydrogen substituting treatment, even a low cost pressure sensor enables the fuel cell system to be reliably started up in a short time period. Also, operations in steps S101 to S103 in FIG. 20 are the same as those in steps S91 to S93 in FIG. 19, and operations in steps S106 to S108 in FIG. 20 are the same as those in steps S95 to S97 in FIG. 19.

According to the presently filed embodiment set forth above, it is possible to reliably achieve necessary and sufficient hydrogen substitution while using the pressure sensor at a low cost and low precision, enabling startup of the system in a stable manner.

Also, while the present invention is described in conjunction with a case wherein the hydrogen substituting flow rate is fixed by maintaining the inlet pressure of the ejector at the constant level, the opening degree of the variable throttle valve is fixed for thereby maintaining the hydrogen substituting flow rate at the constant value.

The entire content of a Patent Application No. TOKUGAN 2002-138905 with a filing date of May 14, 2002 in Japan and that of a Patent Application No. TOKUGAN 2002-138919 with a filing date of May 14, 2002 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As set forth above, the present invention is able to obtain a fuel cell system in that residual fuel gas is discharged outside the fuel cell system, during startup of the fuel cell system, while supplying the fuel gas to a fuel cell in a way to maintain a state quantity of the fuel gas, to be supplied to the fuel cell, at a constant value for thereby allowing fuel gas substituting treatment to be executed to substitute the residual gas in a fuel gas passage and fuel electrodes to be substituted with the fuel gas whereby, even when the fuel cell system stands for a long time period, the fuel cell system is able to reliably start up in a short time period. As a result, the fuel cell system adapted to execute such fuel gas substituting treatment can be applied to fuel cells of other kinds, such as not only a solid polymer type but also a solid oxide type, and applied to a fuel cell powered vehicle and electric power generators for industrial or domestic uses, with such applications being expected in a wide range.

The invention claimed is:

1. A fuel cell system comprising:
   a fuel cell having a fuel electrode and an oxidizer electrode, disposed in opposition thereto, between which an electrolyte membrane is sandwiched;
   a fuel gas supply source supplying fuel gas to the fuel cell through a fuel gas supply passage;
   a fuel gas discharge section discharging the fuel gas, discharged from the fuel cell, to an outside of the fuel cell system;
   a control section executing fuel gas substituting treatment such that, during startup of the fuel cell system, the fuel gas is discharged outside the fuel cell system through the fuel gas discharge section while supplying the fuel gas so as to cause a state quantity of the fuel gas, to be supplied to the fuel cell from the fuel gas supply source, to be constant for thereby allowing the fuel gas supply passage and the fuel electrode to be substituted with the fuel gas; and
   a purge section discharging at least a portion of the fuel gas, discharged from the fuel cell, outside the fuel cell during operation of the fuel cell system,
   wherein the fuel gas discharge section has a larger opening area than the purge section.

2. The fuel cell system according to claim 1, further comprising a first pressure sensor disposed in the fuel gas supply passage,
   wherein the state quantity of the fuel gas is a pressure of the fuel gas detected by the first pressure sensor.

3. The fuel cell system according to claim 2, wherein the fuel cell system is adapted to terminate the fuel gas substituting treatment after an elapse of a given time interval.

4. The fuel cell system according to claim 2, wherein the fuel cell system is adapted to terminate the fuel gas substituting treatment depending on a value correlated with a concentration of fuel gas remaining in the fuel electrode or the fuel gas supply passage.

5. The fuel cell system according to claim 2, further comprising a detector detecting a value correlated to a supply flow rate of the fuel gas,
   wherein the fuel gas substituting treatment is terminated depending on the value detected by the detector.

6. The fuel cell system according to claim 2, further comprising a valve disposed in the fuel gas supply passage and having an opening degree that is variable,
    wherein the opening degree of the valve is actuated to allow pressure of the fuel gas to be maintained at a constant level and the fuel gas substituting treatment is terminated depending on the opening degree of the valve.

7. The fuel cell system according to claim 6, wherein the fuel cell system is adapted to terminate the fuel gas substituting treatment after an elapse of a given time interval when the opening degree of the valve exceeds a given value.

8. The fuel cell system according to claim 2, further comprising:
    a valve disposed in the fuel gas supply passage and having an opening degree that is variable;
    an ejector disposed in the fuel gas supply passage to allow excess fuel gas, discharged from the fuel cell, to be returned to the fuel gas supply passage through the ejector; and
    a second pressure sensor detecting a pressure of the fuel gas upstream of the ejector,
    wherein the fuel gas substituting treatment is terminated depending on the pressure of the fuel gas upstream of the ejector detected by the second pressure sensor.

9. The fuel cell system according to claim 8, wherein the fuel cell system is adapted to terminate the fuel gas substituting treatment after an elapse of a given time interval when the pressure of the fuel gas upstream of the ejector detected by the second pressure sensor exceeds a given value.

10. The fuel cell system according to claim 1, wherein the state quantity of the fuel gas is a supply flow rate of the fuel gas.

11. The fuel cell system according to claim 10, wherein the supply flow rate of the fuel gas is maintained at a constant level by a choke mechanism.

12. The fuel cell system according to claim 10, further comprising a valve disposed in the fuel gas supply passage and having an opening degree that is variable,
    wherein the opening degree of the valve is fixed when the fuel gas substituting treatment is executed.

13. The fuel cell system according to claim 10, further comprising:
    a valve disposed in the fuel gas supply passage and having an opening degree that is variable;
    an ejector disposed in the fuel gas supply passage to allow excess fuel gas, discharged from the fuel cell, to be returned to the fuel gas supply passage through the ejector;
    a first pressure sensor detecting a pressure of the fuel gas downstream of the ejector, and
    a second pressure sensor detecting a pressure of the fuel gas upstream of the ejector,
    wherein opening of the valve is controlled during execution of the fuel gas substituting treatment such that the pressure of the fuel gas upstream of the ejector detected by the second pressure sensor is maintained at a given value.

14. The fuel cell system according to claim 13,
    wherein the given value of the fuel gas is determined corresponding to the pressure of the fuel gas downstream of the ejector detected by the first pressure sensor during execution of the fuel gas substituting treatment.

15. The fuel cell system according to claim 10, wherein the fuel cell system is adapted to terminate the fuel gas substituting treatment after an elapse of a given time interval.

16. The fuel cell system according to claim 10, wherein the fuel cell system is adapted to terminate the fuel gas substituting treatment depending on a value correlated with a concentration of fuel gas remaining in the fuel electrode or the fuel gas supply passage.

17. The fuel cell system according to claim 10, wherein the fuel cell system is adapted to terminate the fuel gas substituting treatment depending on a pressure of the fuel gas upstream of the fuel gas discharge section.

18. The fuel cell system according to claim 17, wherein the fuel cell system is adapted to terminate the fuel gas substituting treatment after an elapse of a given time interval when the pressure of the fuel gas upstream of the fuel gas discharge section exceeds a given value.

19. A fuel cell system comprising:
    a fuel cell having a fuel electrode and an oxidizer electrode, disposed in opposition thereto, between which an electrolyte membrane is sandwiched;
    supplying means for supplying fuel gas to the fuel cell through a fuel gas supply passage;
    discharging means for discharging the fuel gas, discharged from the fuel cell, to an outside of the fuel cell system;
    controlling means for controlling fuel gas substituting treatment such that, during startup of the fuel cell system, the fuel gas is discharged outside the fuel cell system through the discharging means while supplying the fuel gas so as to cause a state quantity of the fuel gas, to be supplied to the fuel cell from the supplying means, to be constant for thereby allowing the fuel gas supply passage and the fuel electrode to be substituted with the fuel gas; and
    a purge means for discharging at least a portion of the fuel gas, discharged from the fuel cell, outside the fuel cell during operation of the fuel cell system,
    wherein the discharging means has a laraer opening area than the purge means.

20. A method of substituting fuel gas in a fuel cell system which includes a fuel cell having a fuel electrode and an oxidizer electrode, disposed in opposition thereto, between which an electrolyte membrane is sandwiched, the method comprising:
    supplying fuel gas to the fuel cell through a fuel gas supply passage;
    discharging the fuel gas, discharged from the fuel cell, to an outside of the fuel cell system via a fuel gas discharge section; and
    executing fuel gas substituting treatment such that, during startup of the fuel cell system, the fuel gas is discharged outside the fuel cell system while supplying the fuel gas so as to cause a state quantity of the fuel gas, to be supplied to the fuel cell, to be constant for thereby allowing the fuel gas supply passage and the fuel electrode to be substituted with the fuel gas, wherein
    at least a portion of the fuel gas, discharged from the fuel cell, is discharged outside the fuel cell during operation of the fuel cell system via a purge section, and
    the fuel gas discharge section has a larger opening area than the purge section.

21. A fuel cell system comprising:
    a fuel cell having a fuel electrode and an oxidizer electrode, disposed in opposition thereto, between which an electrolyte membrane is sandwiched;
    a fuel gas supply source adapted to supply fuel gas to the fuel cell through a fuel gas supply passage;
    a fuel gas discharge section adapted to discharge the fuel gas, discharged from the fuel cell, to an outside of the fuel cell system; and
    a control section adapted to execute fuel gas substituting treatment such that, during startup of the fuel cell system, the fuel gas is discharged outside the fuel cell system through the fuel gas discharge section while supplying the fuel gas so as to cause a state quantity of the fuel gas, to be supplied to the fuel cell from the fuel gas supply source, to be constant for thereby allowing the fuel gas supply passage and the fuel electrode to be substituted with the fuel gas; and a purge section adapted to discharge at least a portion of the fuel gas, discharged from the fuel cell, outside the fuel cell during operation of the fuel cell system, wherein the fuel gas discharge section has a laraer opening area than the purge section.

22. The fuel cell system according to claim 19, further comprising a first pressure sensor disposed in the fuel gas supply passage, wherein the state quantity of the fuel gas is a pressure of the fuel gas detected by the first pressure sensor.

23. The method according to claim 20, further comprising utilizing a first pressure sensor disposed in the fuel gas supply passage to detect a pressure of the fuel gas, wherein the state quantity of the fuel gas is the pressure of the fuel gas detected by the first pressure sensor.

24. The fuel cell system according to claim 21, further comprising a first pressure sensor disposed in the fuel gas supply passage, wherein the state quantity of the fuel gas is a pressure of the fuel gas detected by the first pressure sensor.

* * * * *